United States Patent
Lu et al.

(10) Patent No.: US 9,909,533 B2
(45) Date of Patent: Mar. 6, 2018

(54) PULSED DETONATION ENGINE

(75) Inventors: Frank K. Lu, Arlington, TX (US);
Donald R Wilson, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 123 days.

(21) Appl. No.: 13/561,074

(22) Filed: Jul. 29, 2012

(65) Prior Publication Data
US 2013/0025256 A1    Jan. 31, 2013

Related U.S. Application Data

(60) Provisional application No. 61/512,980, filed on Jul. 29, 2011.

(51) Int. Cl.
| | |
|---|---|
| F02K 7/02 | (2006.01) |
| F23R 7/00 | (2006.01) |
| F02K 7/04 | (2006.01) |
| F02C 5/11 | (2006.01) |
| F02K 7/067 | (2006.01) |
| F02C 5/12 | (2006.01) |
| F02K 7/06 | (2006.01) |
| F02C 5/10 | (2006.01) |
| F23R 3/28 | (2006.01) |

(52) U.S. Cl.
CPC .............. *F02K 7/02* (2013.01); *F02C 5/10* (2013.01); *F02C 5/11* (2013.01); *F02C 5/12* (2013.01); *F02K 7/04* (2013.01); *F02K 7/06* (2013.01); *F02K 7/067* (2013.01); *F23R 7/00* (2013.01); *F23C 2205/00* (2013.01); *F23C 2205/10* (2013.01); *F23C 2205/20* (2013.01); *F23R 3/286* (2013.01); *Y02T 50/671* (2013.01)

(58) Field of Classification Search
CPC ...... F02C 5/10; F02C 5/11; F02C 5/12; F02K 7/02; F02K 7/04; F02K 7/06; F02K 7/067; F23R 7/00; F23R 3/286; F23C 2205/00; F23C 2205/10; F23C 2205/20
USPC .......................... 60/39.38, 39.76, 247; 431/1
See application file for complete search history.

(56) References Cited

U.S. PATENT DOCUMENTS

| 5,513,489 A | * | 5/1996 | Bussing | ........................ 60/39.38 |
| 5,901,550 A | * | 5/1999 | Bussing et al. | ............... 60/39.38 |
| 6,062,018 A | * | 5/2000 | Bussing | ........................ 60/39.39 |

(Continued)

*Primary Examiner* — Gerald L Sung
*Assistant Examiner* — Scott Walthour
(74) *Attorney, Agent, or Firm* — FisherBroyles, LLP; Anthony J. DoVale

(57) ABSTRACT

A pulsed detonation engine may include a detonation tube for receiving fuel and an oxidizer to be detonated therein, one or more fuel-oxidizer injectors for injecting the fuel and oxidizer into the detonation tube, one or more purge air injectors for injecting purge air into the detonation tube for purging the detonation tube, and an ignition for igniting the fuel and oxidizer in the detonation tube so as to initiate detonation thereof. The detonation tube has an upstream end, a downstream end, and an axially extended portion extending from the upstream end to the downstream end and having a perimeter. The fuel-oxidizer injectors and purge air injectors may be disposed at least along the axially extended portion. The ignition may include a plurality of igniters disposed at or near the perimeter of the axially extended portion, spaced about the perimeter, at or near the upstream end of the detonation tube.

20 Claims, 19 Drawing Sheets

(56) References Cited

U.S. PATENT DOCUMENTS

| | | |
|---|---|---|
| 6,755,024 B1* | 6/2004 | Mao et al. ............... 60/776 |
| 2005/0144959 A1* | 7/2005 | Lu et al. ................. 60/776 |
| 2007/0137171 A1* | 6/2007 | Chapin et al. ........... 60/39.76 |
| 2007/0180814 A1* | 8/2007 | Tangirala et al. ........ 60/204 |
| 2009/0283058 A1* | 11/2009 | Modroukas et al. ...... 123/2 |
| 2010/0008179 A1* | 1/2010 | Lacy ...................... F23R 3/34 |
| | | 366/134 |
| 2010/0288364 A1* | 11/2010 | Singh et al. ............. 137/1 |
| 2012/0102916 A1* | 5/2012 | Bunker ................... 60/247 |
| 2012/0144798 A1* | 6/2012 | Brumberg et al. ....... 60/247 |

* cited by examiner

PULSED DETONATION ENGINE

CROSS-REFERENCE TO RELATED APPLICATIONS

This application claims the benefit of the filing date of U.S. Provisional Patent Application No. 61/512,980, incorporated herein by reference, which was filed on Jul. 29, 2011, by the same inventors of this application.

STATEMENT REGARDING FEDERALLY SPONSORED RESEARCH

Not applicable.

TECHNICAL FIELD OF THE INVENTION

The present disclosure relates generally to pulsed detonation engines (PDEs), methods of operating the same, and systems including the same. More particularly, the disclosure relates to improvements in achieving detonation, increasing operating frequency, the use of liquid fuels and various other aspects of a large PDE, operation of such engine, and systems including such engine.

BACKGROUND

In a conventional combustion engine, energy from fuel is converted to useful work by a subsonic combustion process, referred to as deflagration. In contrast, a PDE operates by means of a supersonic combustion process, referred to as detonation (or quasi-detonation). The detonation may be initiated, for example, by igniting a fuel and air (or oxidizer) mixture in a detonation chamber. For practical purposes, such detonations must be repeated at a high frequency.

Compared to conventional combustion engines, PDEs have higher thermodynamic efficiencies and fewer moving parts, among other advantages. Nonetheless, various challenges remain in achieving a PDE of sufficient practical applicability. Areas for improvement include achieving detonation, using liquid fuels, and increasing operating frequency (or, in other words, decreasing the cycle time), among others.

SUMMARY

Embodiments of the present invention provide PDEs, methods of operating the same, and systems including the same, that address the aforementioned areas for improvement.

According to a first aspect of the invention, there is provided a pulsed detonation engine comprising a detonation tube configured to receive fuel and an oxidizer to be detonated therein; one or more fuel-oxidizer injectors configured to inject the fuel and the oxidizer into the detonation tube; and an ignition configured to ignite the fuel and the oxidizer in the detonation tube so as to initiate detonation of the fuel and the oxidizer. The detonation tube comprises an upstream end, a downstream end, a longitudinal axis extending from the upstream end to the downstream end, and an axially extended portion extending along the longitudinal axis from the upstream end to the downstream end. The one or more fuel-oxidizer injectors are disposed at least along the axially extended portion of the detonation tube.

According to a second aspect of the invention, there is provided a pulsed detonation engine comprising a detonation tube configured to receive fuel and an oxidizer to be detonated therein; one or more fuel-oxidizer injectors configured to inject the fuel and the oxidizer into the detonation tube; an ignition configured to ignite the fuel and the oxidizer in the detonation tube so as to initiate detonation of the fuel and the oxidizer; and one or more purge air injectors configured to inject purge air into the detonation tube for purging the detonation tube. The detonation tube comprises an upstream end, a downstream end, a longitudinal axis extending from the upstream end to the downstream end, and an axially extended portion extending along the longitudinal axis from the upstream end to the downstream end. The one or more purge air injectors are disposed at least along the axially extended portion of the detonation tube.

According to a third aspect of the invention, there is provided a pulsed detonation engine comprising: a detonation tube configured to receive fuel and an oxidizer to be detonated therein; one or more fuel-oxidizer injectors configured to inject the fuel and the oxidizer into the detonation tube; and an ignition configured to ignite the fuel and the oxidizer in the detonation tube so as to initiate detonation of the fuel and the oxidizer. The detonation tube comprises an upstream end, a downstream end, a longitudinal axis extending from the upstream end to the downstream end, a perimeter at any point along the longitudinal axis, and an axially extended portion extending (a) along the longitudinal axis from the upstream end to the downstream end, and (b) from the longitudinal axis, at any point thereon, in a direction perpendicular to the longitudinal axis, to the perimeter. The ignition comprises a plurality of igniters disposed at or near the perimeter, spaced about the perimeter, at or near the upstream end.

According to a fourth aspect of the invention, there is provided a method of operating a pulsed detonation engine according to the first aspect, the method comprising injecting the fuel and the oxidizer into the detonation tube via the one or more injectors; and igniting the fuel and the oxidizer in the detonation tube so as to initiate detonation of the fuel and the oxidizer. The fuel and the oxidizer are injected into the detonation tube at least along the axially extended portion of the detonation tube.

According to a fifth aspect of the invention, there is provided a method of operating a pulsed detonation engine according to the second aspect, the method comprising: injecting the fuel and the oxidizer into the detonation tube via the one or more injectors; igniting the fuel and the oxidizer in the detonation tube so as to initiate detonation of the fuel and the oxidizer; and injecting purge air into the detonation tube for purging the detonation tube. The purge air is injected into the detonation tube at least along the axially extended portion of the detonation tube.

According to a sixth aspect of the invention, there is provided a method of operating a pulsed detonation engine according to the third aspect, the method comprising injecting the fuel and the oxidizer into the detonation tube via the one or more injectors; and igniting the fuel and the oxidizer in the detonation tube so as to initiate detonation of the fuel and the oxidizer. The igniting of the fuel and the oxidizer comprises simultaneously igniting all of the plurality of igniters.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
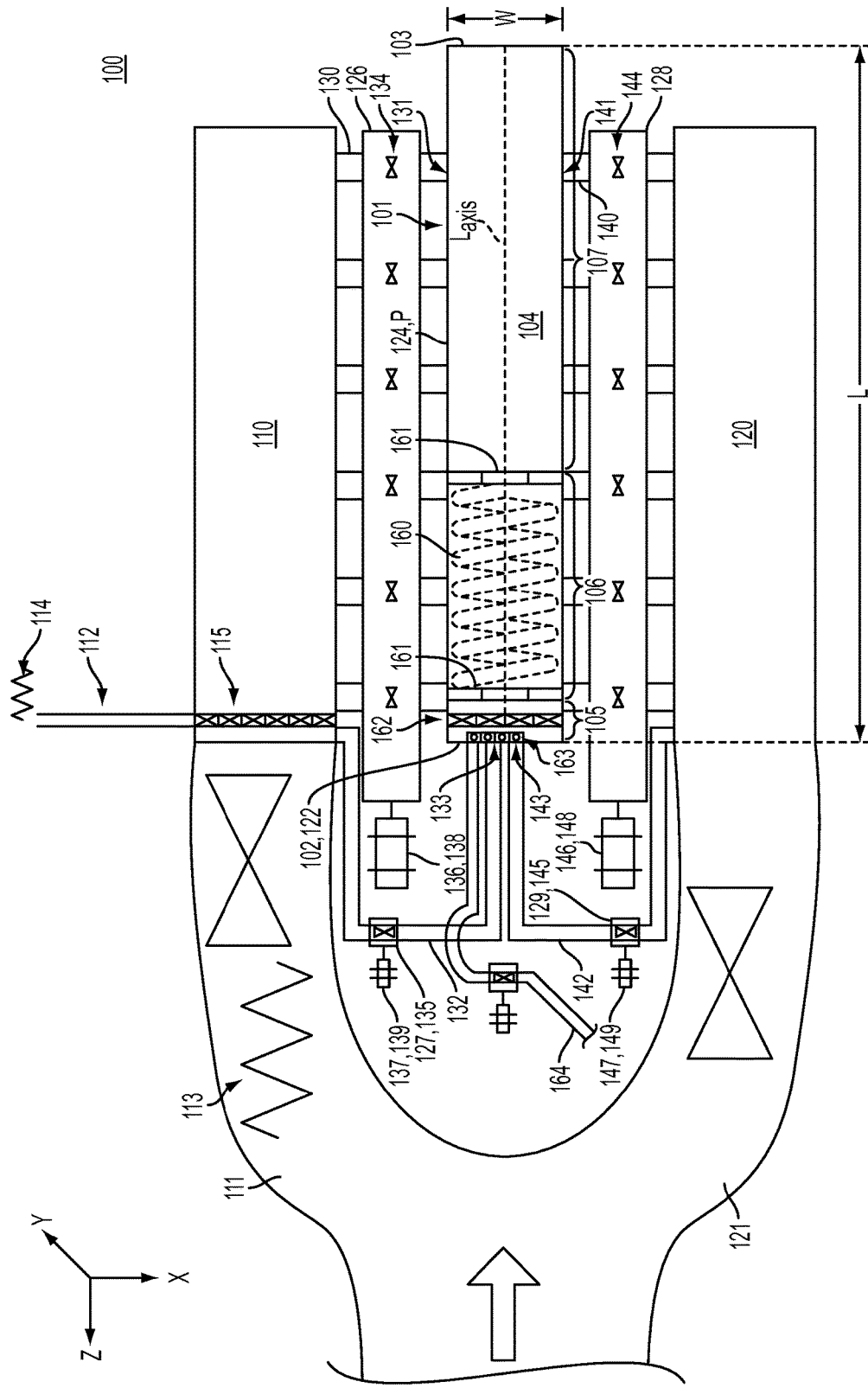
FIG. 1 is a schematic view of a PDE in accordance with some embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described or illustrated in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

A practical PDE operates in a cyclic manner. The cycle of operation may be explained as follows, with respect to the detonation tube, in which the detonations occur. The detonation tube may also be referred to as a detonation chamber or a combustor. The detonation tube may be understood as a tube, closed at one end and open at the other end. The closed end is the upstream end and the open end is the downstream end. The detonation tube is initially at ambient conditions. The cycle begins with the filling of the tube from the upstream end with fuel and air or oxidizer, as reactants. The reactants are ignited at the upstream end. The ignition initiates a detonation wave, which compresses the fluid reactants as it propagates rapidly through the reactive mixture downstream and exits the tube at the downstream end. This is followed by an exhaust stage in which an expansion wave enters the tube at the downstream end and travels upstream, causing the compressed fluid reactants to be exhausted out of the downstream end, yielding thrust. Finally, purge air is introduced into the detonation tube to cool and scavenge the tube so as to prevent autoignition of reactants in the tube and to prepare the tube for the subsequent cycle. To be sure, this version of the cycle of operation of the PDE may be modified in various ways, as will be understood by those of ordinary skill in the art. For example, purging may be commenced earlier so that the purge air reaches the exit of the tube at the same time as the detonation wave.

Detonation may be achieved in different ways. If the ignition energy is high enough, detonation may be directly initiated by ignition, so-called direct initiation. However, such high energy is difficult to achieve, and high energy has been shown to wear away or destroy the igniters. Accordingly, various alternatives have been explored to enhance detonation so as not to require such high ignition energy. One such alternative is a deflagration-to-detonation transition (DDT), whereby a device, e.g., partly obstructing the path of the reactants, may be included in the detonation tube, to increase turbulence, causing an initial deflagration caused by the ignition to transition to a detonation. The distance along detonation tube 101 required for the deflagration to transition to a detonation is referred to as the DDT distance. DDT devices also have drawbacks, for example, they cause drag, which reduces the thrust generated by the PDE, and they increase the length of the detonation tube, which increases the cycle time (reduces operating frequency) and reduces the compactness of the PDE. Other ways to enhance detonation will be described below.

The time required for the cycle of operation of a PDE to occur may be given by the following equation:

$$t_{cyc} = t_{fill} + t_{ign+det} + t_{prop} + t_{purge} \quad (1)$$

where the subscripts cyc, fill, ign+det, prop and purge denote cycle, fill, ignition and detonation, wave propagation, and purge and exhaust, respectively. Accordingly, the frequency of operation is given by the following equation:

$$f = 1/t_{cyc} \quad (2)$$

Thus, to increase the frequency of operation, it is necessary to decrease the cycle time, $t_{cyc}$. Among the several components of the cycle time, the ignition and detonation times are negligibly small compared to the other components; the fill and purge times are the most time-consuming portions of the cycle.

For many practical applications, it is desired that a PDE use air and liquid fuel, such as a liquid hydrocarbon fuel (LHC), as reactants for combustion, rather than oxygen and a gaseous fuel. Using air rather than oxygen potentially eliminates cost, weight and complexity. Liquid fuels have advantages over gaseous fuels, for example, high energy density, ease of storage, portability and safety. However, liquid hydrocarbon fuels pose difficulties of their own. For example, LHCs are far more difficult to detonate than hydrogen or gaseous hydrocarbons, a problem compounded by using air instead of oxygen as oxidizer. Compared to gaseous hydrocarbons, LHCs require larger initiation energy, longer ignition time, longer DDT distance, and extra time for atomization and vitiation, thus potentially making detonation more difficult to achieve and increasing the cycle time or, in other words, decreasing the frequency.

A critical parameter for PDE design is the so-called detonation cell size (or width) λ, which varies for different fuel-oxidizer mixtures. The cell width λ is the width (perpendicular to the direction of wave propagation) of the diamond-shaped pattern made by a detonation wave in a detonation tube. Cell width λ (among other factors) dictates the minimum diameter of the detonation tube and may also govern the minimum length of the detonation tube. Cell width λ is also a measure of detonability. The smaller the cell width λ of a given fuel-oxidizer mixture, the more energetic and easily detonable the mixture is. Thus, a detonation tube must be sized to accommodate the specific fuel-oxidizer mixtures intended to be used. A larger tube diameter will accommodate a greater number of different fuel-oxidizer mixtures.

The structure and operation of a PDE according to embodiments of the present invention will now be described more specifically with reference to the figures. In the course of this description, reference will be made to various features and aspects that address the above-noted and other challenges in achieving a PDE of sufficient practical applicability.

Figure 2:
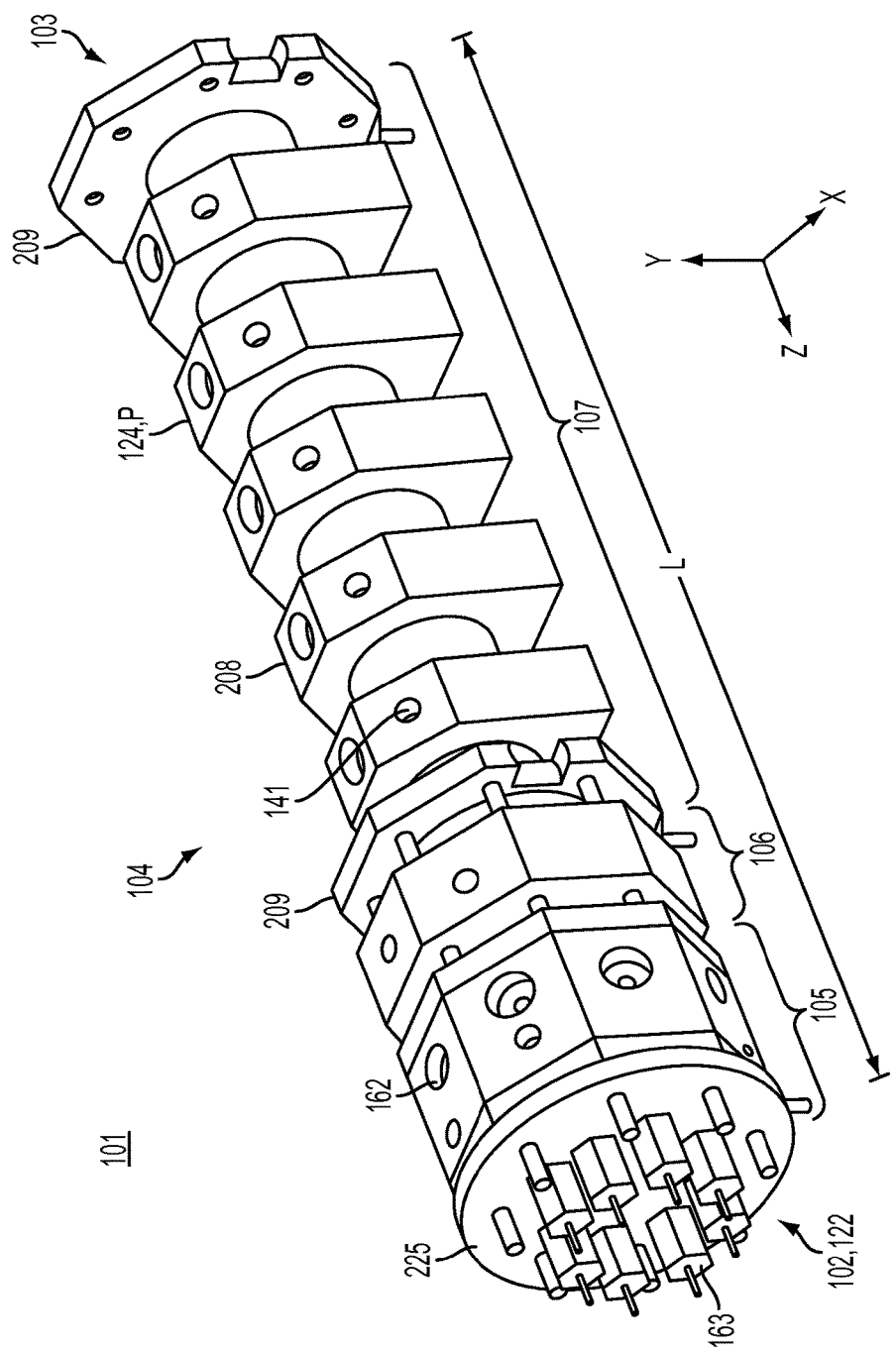
FIG. 2 is a schematic perspective view of a PDE in accordance with some embodiments.
Figure 3:
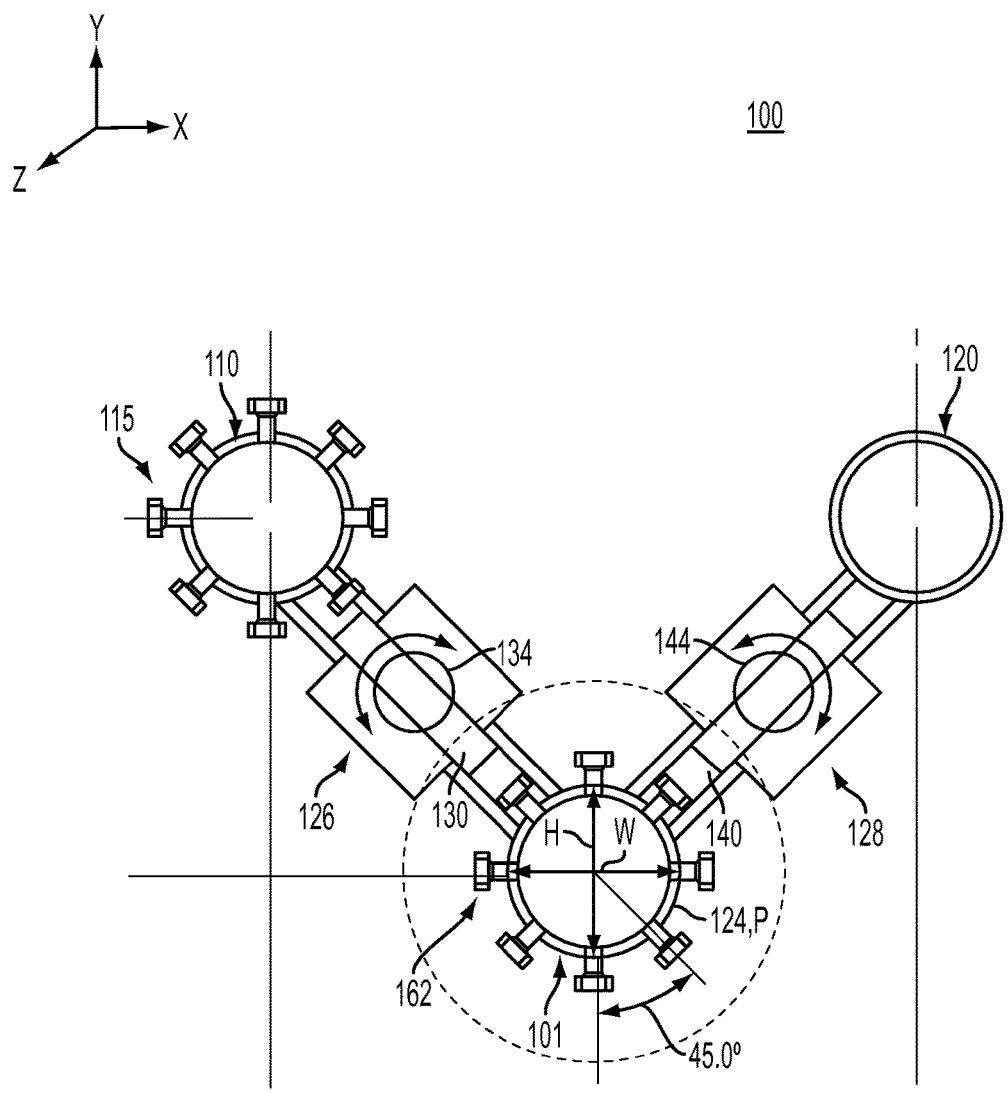
FIG. 3 is a schematic end view of a PDE in accordance with some embodiments.
Figure 4:
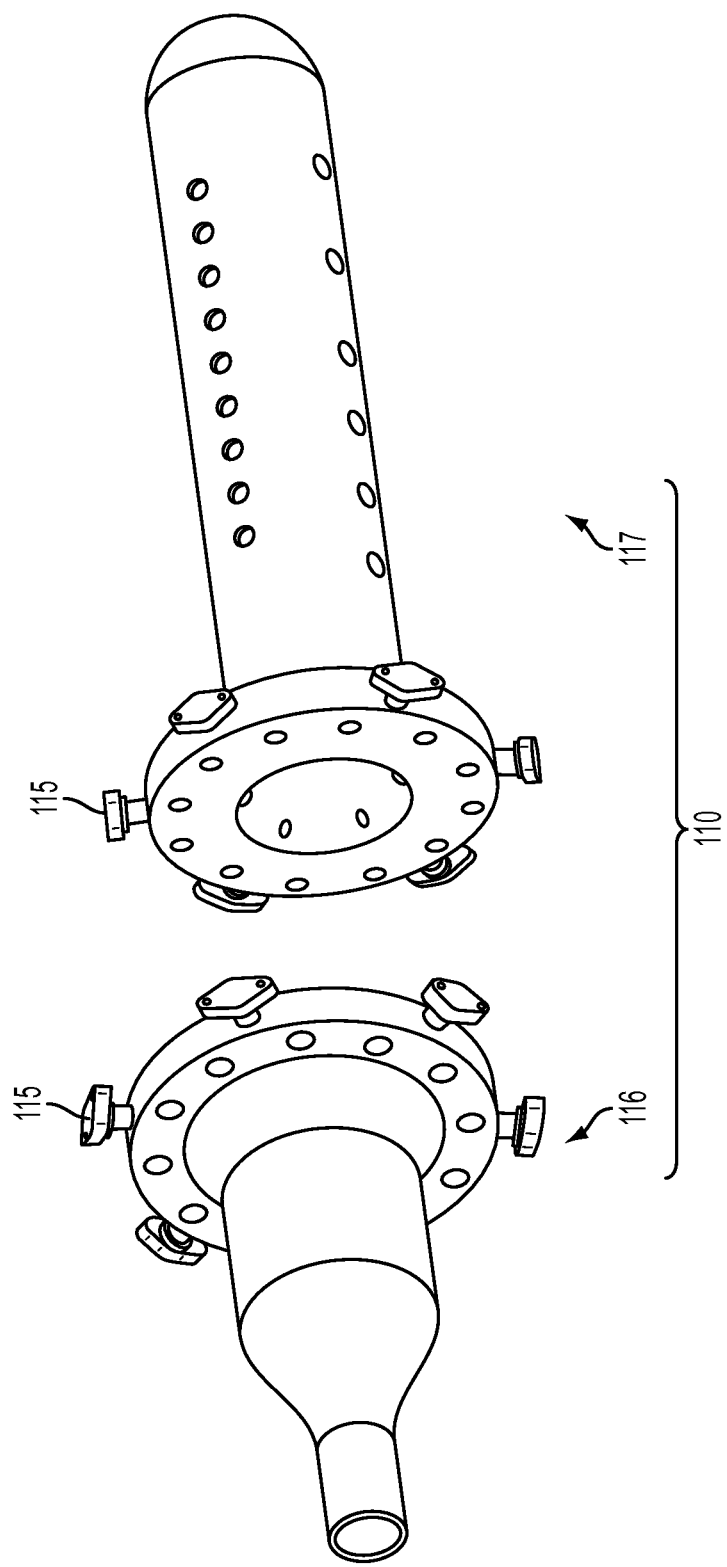
FIG. 4 is a schematic exploded perspective view of a fuel-air mixing chamber of a PDE in accordance with some embodiments.

Referring to FIGS. 1-4, the overall arrangement of a PDE, according to some embodiments, will be described. FIG. 1 is a schematic view of a PDE in accordance with some embodiments. FIG. 2 is a schematic perspective view of a PDE in accordance with some embodiments. FIG. 3 is a schematic end view of a PDE in accordance with some embodiments. FIG. 4 is a schematic exploded perspective view of a fuel-air mixing chamber of a PDE in accordance with some embodiments.

A PDE 100 includes a detonation tube 101, which receives fuel and an oxidizer as reactants to be detonated therein. PDE 100 may use kerosene, propane, hydrogen, jet fuels, or other LHCs and air or another oxidizer. Based on considerations such as those discussed above, according to some embodiments, detonation tube 101 may have a diameter of approximately 100 mm and a length of approximately 1 meter. Other dimensions are possible. Detonation tube 101 has an upstream end 102 (shown at the left side of detonation tube 101 in FIGS. 1 and 2), a downstream end 103 (shown at the right side of detonation tube 101 in FIGS. 1 and 2), a longitudinal axis $L_{axis}$ extending in the z-direction from upstream end 102 to downstream end 103, and an axially extended portion 104 extending along longitudinal axis $L_{axis}$ from upstream end 102 to downstream end 103. (According to the coordinate axes given in the figures, the +z direction extends in the direction from downstream to upstream. However, for the sake of simplicity, the positive and negative directionality of the coordinate axes may generally be ignored.)

Detonation tube 101 includes a head manifold section (or head manifold) 105, a DDT section 106 and a blowdown section 107, disposed in the listed order from upstream end 102 to downstream end 103. Head manifold section 105 includes upstream end 102 and a portion of axially extended portion 104. Blowdown section 107 includes downstream end 103 and a portion of axially extended portion 104. Head manifold section 105, DDT section 106 and blowdown section 107 will be further described below.

Detonation tube 101, or axially extended portion 104 thereof, has a length L extending in the z-direction, i.e., from upstream end 102 to downstream end 103, a height H extending in the y-direction, a width W extending in the x-direction, and a perimeter P (see FIGS. 1 and 3). The terms height H, width W, and perimeter P as used herein refer to exterior dimensions. As seen in FIG. 2, according to some embodiments, height H, width W, and perimeter P may not be uniform along length L of detonation tube 101. For example, as seen in FIG. 2, blowdown section 107 may include central flange portions 208 and end flange portions 209 having non-cylindrical cross-sections, whereas the portions of detonation tube 101 between any two adjacent flange sections 208, 209 have cylindrical cross-sections. As illustrated in FIG. 2, for example, height H and width W of any central flange 208 exceed the corresponding measurements of the portions between two adjacent central flanges 208, and the shape and size of perimeter P of any central flange 208 differs from those of the portions between two adjacent central flanges 208. Again, as illustrated in FIG. 2, for example, perimeter P of head manifold 105 and DDT section 106 is octagonal, while the shape of perimeter P of central flanges 208 is an irregular polygon whose upper half is octagonal and whose bottom half is square. By making perimeter P, at least over a portion of length L, include one or more straight line portions, such as a flat bottom, rather than being completely curved, such as circular, detonation tube 101 may be provided with ease of mounting and stability. To be sure, however, height H, width W, and the shape and size of perimeter P may be varied from those illustrated herein, and may be uniform along length L, or may vary along length L in ways different than those illustrated herein, as will be understood by one of ordinary skill in the art. The interior shape/interior perimeter of detonation tube 101 may or may not be cylindrical/circular over a portion of length L or over the entirety of length L. Of course, where a perimeter, exterior or interior, is circular, it may be referred to as a circumference, and in that case, both the height and width may be referred to as a diameter.

PDE 100 uses fuel and an oxidizer as reactants for detonation. The oxidizer may be, for example, air or oxygen. As noted, for many practical applications, air is preferred over oxygen. For the sake of simplicity, the oxidizer may be referred to hereinbelow as air, it being understood that an alternative oxidizer, such as oxygen, could be used instead. The term "air" may thus be used herein as a shorthand both with reference to the oxidizer itself and as a replacement for the term "oxidizer" in other elements involving the oxidizer (e.g., fuel-oxidizer premixing chamber, oxidizer supply, etc.).

PDE 100 includes fuel-oxidizer premixing chamber (or fuel-oxidizer chamber) 110, which may be referred to as fuel-air premix chamber (or fuel-air chamber) 110 for the sake of simplicity, again, it being understood that an alternative oxidizer, such as oxygen, could be used instead. PDE 100 also includes a purge air plenum chamber 120, which may be referred to as a purge air chamber 120. As will be understood by one of ordinary skill in the art, it is possible to configure PDE 100 without fuel-air premix chamber 110, in which case fuel and air could be supplied separately to detonator 101 to be mixed therein, and without purge air chamber 120, in which case purging would not be performed. As seen in FIG. 3, one possible physical arrangement of detonation tube 101, fuel-air premix chamber 110 and purge air chamber 120 is a V-shaped arrangement with detonator 101 located at the bottom of the V shape and fuel-air premix chamber 110 and purge air chamber 120 located respectively at the tops of the two sides of the V shape. Another possible physical arrangement of these three components would be an inverted V shape, i.e. an inversion of the V shape shown in FIG. 3, with detonator 101 located at the top of the inverted V shape and fuel-air premix chamber 110 and purge air chamber 120 located respectively at the bottoms of the two sides of the inverted V shape. The latter arrangement may permit greater compactness and accessibility, which may facilitate operation and maintenance. Of course, other physical arrangements of these three components are possible, as will be understood by one of ordinary skill in the art.

As illustrated in FIG. 1, PDE 100 also includes an air supply line 111 for supplying air to fuel-air premix chamber 110, and a purge air supply line 121 for supplying air to purge air chamber 120. Air supply line 111 and purge air supply line 121 may stem from (be sublines of) a common air supply line (shown at the arrow) as seen in FIG. 1. The common air supply line may be supplied with air from an air intake/fan 1770 (see FIG. 17) (along the lines of a turbo fan of a jet engine) for driving in air and increasing the pressure of the incoming air to a pressure suitable for use by PDE 100, e.g., approximately 75 psi. Of course, if an oxidizer other than air were employed instead of air for combining with the fuel and being detonated in detonation tube 101, then air supply line 111 may lead to its own supply of oxidizer and not to such a common air supply line.

With continued reference to FIG. 1, PDE 100 also includes a fuel supply line 112 for supplying fuel to fuel-air premix chamber 110. Fuel supply line 112 may be supplied with fuel from a fuel supply (not shown). Prior to entering fuel-air premix chamber 110, the fuel may be rendered inert using, e.g., nitrogen, and pressurized as appropriate for use by PDE 100, as will be understood by one of ordinary skill in the art.

Valving and safety mechanisms (e.g., shutoff, accumulator/surge tank) may be provided to control the flow of air in air supply line 111, purge air supply line 121, and the flow of fuel in fuel supply line 112. Preferably, the ratio of quantities of fuel and air injected into detonation tube 101 for the fill stage of a given operating cycle is stoichiometric or as close to stoichiometric as feasible, as this enhances detonability by reducing the required amount of initiation energy. The valving may be used in the service of obtaining these desired ratios in fuel-air premix chamber 110.

With further reference to FIG. 1, PDE 100 also includes an air heater 113 located, e.g., along air supply line 111, for heating the air that is to enter fuel-air premix chamber 110, and a fuel heater 114 located, e.g., along fuel supply line 112, for heating the fuel that is to enter fuel-air premix chamber 110. Heaters 113 and 114 may be electric or other appropriate heaters and may be collectively referred to as a heater. The heated fuel is injected into the fuel-air premix chamber 110 by one or more fuel injectors 115, which according to some embodiments may be diesel injectors and may number twelve. With reference to FIGS. 3 and 4, according to some embodiments, fuel injectors 115 may be arranged equally spaced about the perimeter, in this case, circumference, of fuel-air premix chamber 110, where the cap 116 of fuel-air premix chamber 110 is attached to the main body portion 117 of fuel-air premix chamber 110. The heated air is supplied to fuel-air premix chamber 110 at the other longitudinal end of cap 116, i.e., opposite the longitudinal end of cap 116 that attaches to main body portion 117, as seen in FIG. 4. A fuel supply return line (not illustrated) may be provided to return excess fuel from fuel injectors 115 to a fuel reservoir (not illustrated), although this may be unnecessary given adequate control of flow volume through fuel injectors 115.

According to some embodiments, the liquid fuel is flash vaporized prior to entering detonation tube 101. Flash vaporization helps overcome some of the difficulties associated with liquid fuels, e.g., long ignition times and high initiation energy. For the purpose of flash vaporization, the liquid fuel may be heated by fuel heater 114 to a temperature below its boiling point. In the case of kerosene, which may serve as a surrogate for various jet fuels, the liquid fuel may preferably be heated to 200-210 degrees Celsius, near its flash point. The heating of the air to be supplied to fuel-air premix chamber 110 also assists in the flash vaporization of the liquid fuel. The air may preferably be heated to 100-200 degrees Celsius. Other heating temperatures for the fuel and air may also be used. When the heated fuel is injected into the heated air in fuel-air premix chamber 110, flash vaporization of the heated fuel occurs. Then the fuel may be supplied in gaseous form to detonation tube 101. Flash vaporization thus allows exploitation of the advantages of liquid fuels while mitigating some of the disadvantages, discussed above.

In addition to providing for preheating of the fuel and air, embodiments of the present invention provide for premixing of the fuel and air, by virtue of fuel-air premix chamber 110. Premixing the fuel and air prior to their entry into detonation chamber 101 may serve to reduce the operating cycle time (e.g., fill time), i.e., increase operating frequency. Thus, flash vaporization and premixing occur together in fuel-air premix chamber 110, and the resulting fuel-air mixture is fed to detonator tube 101. As an alternative to fuel-air premix chamber 110, according to some embodiments, multiple smaller fuel-air premix chambers (not shown) could be provided just prior to entry of the fuel-air mixture into detonation tube 101. The small chambers would incorporate fuel injectors directing fuel into air which is swirled as it is introduced into detonation tube 101.

The fuel-air mixture is injected into detonation tube 101 through fuel-air ports by fuel-air injectors. The fuel-air ports and fuel-air injectors preferably include one or more sidewall fuel-air injectors 130 and corresponding sidewall fuel-air ports 131 and one or more endwall fuel-air injectors 132 and corresponding endwall fuel-air port(s) 133 (see FIGS. 1 and 3). Thus, a sidewall injector is an injector that injects fluid into detonation tube 101 through a sidewall port located on the sidewall 124 of detonation tube 101, or in other words, along (the longitudinally extending wall of) axially extended portion 104 of detonation tube 101. (The longitudinally extending wall of axially extended portion 104 is here conceived of as a single wall, as if axially extended portion 104 were fully cylindrical, and this single wall is referred to as sidewall 124.) Likewise, an endwall injector is an injector that injects fluid into detonation tube 101 through an endwall port located on the endwall 122 of detonation tube 101, or in other words, at the upstream end 102 of detonation tube 101. According to some embodiments, PDE 100 may preferably have a plurality of sidewall fuel-air injectors/ports 130/131 and a single endwall fuel-air injector/port 132/133, as illustrated in FIG. 1. According to some embodiments, between six and nine sidewall fuel-air injectors 130 are employed. Some or all of sidewall fuel-air injectors 130 may be spaced evenly along sidewall 124. By using sidewall fuel-air injectors 130 along the length of sidewall 124 (length L of axially extended portion 104), rather than just one or more endwall fuel-air injectors 132, detonation tube 101 can be filled with the fuel-air mixture more quickly, thus reducing fill time, and permitting increased operating frequency. Endwall fuel-air injector 132 helps quickly fill dead regions in detonation tube 101 upstream of the upstream-most sidewall fuel-air injector 130. According to some embodiments, however, no endwall fuel-air injectors are provided.

The injection, or flow, of the fuel-air mixture from fuel-air premix chamber 110, through sidewall fuel-air injectors 130/sidewall fuel-air ports 131 and endwall fuel-air injector 132/endwall fuel-air port 133, to detonation tube 101 is controlled by sidewall fuel-air valves 134 and endwall fuel-air valve 135. Sidewall fuel-air valves 134 are contained in a housing 126 therefor, and endwall fuel-air valve 135 is contained in a housing 127 therefor. Valves 134, 135 may be driven, respectively, by motors 136, 137. In turn, motors 136, 137 may be controlled, respectively, by controllers 138, 139. Although FIG. 1 depicts each motor-controller pair 136/138 and 137/139 as being located together in a single unit, each controller 138, 139 may be located remotely from its associated motor 136, 137. Remote computerized control of motors 136, 137 and controllers 138, 139 may also be implemented. The operation of the fuel-air valve system (i.e., valves 134, 135, motors 136, 137 and controllers 138, 139) will be described below.

The arrangement for injecting purge air from purge air chamber 120 to detonation tube 101 is similar to the arrangement described above for injecting the fuel-air mixture from fuel-air premix chamber 110 to detonation tube 101. Thus, the purge air is injected into detonation tube 101 through purge air ports by purge air injectors. The purge air ports and purge air injectors preferably include at least one or more sidewall purge air injectors 140 and corresponding sidewall purge air ports 141. FIG. 1 illustrates an endwall purge air injector 142 and corresponding endwall purge air port 143, and additional endwall purge air injectors 142 and corresponding endwall purge air ports 143 are possible. However, according to some embodiments, PDE 100 may preferably have no endwall purge air injectors 142 or corresponding endwall purge air ports 143, but rather only sidewall purge air injectors 140 and corresponding sidewall purge air ports 141. According to some embodiments, between six and nine sidewall purge air injectors 140 are employed. (The terminology "sidewall injector," "sidewall port," "endwall injector," and "endwall port" has been explained above in the discussion of fuel-air injectors and ports.) Some or all of sidewall purge air injectors 140 may be spaced evenly along sidewall 124. By using sidewall purge air injectors 140 along the length of sidewall 124 (length L of axially extended portion 104), rather than just one or more endwall purge air injectors 142, detonation tube 101 can be purged more quickly, thus reducing purge time, and permitting increased operating frequency.

With reference to the above discussion, it should be noted that sidewall purge air injectors 140 and sidewall purge air ports 141 may be located at positions on sidewall 124 that are opposed to the positions of sidewall fuel-air injectors 130 and sidewall fuel-air ports 131 on sidewall 124, as seen in FIGS. 1 and 3. By "opposed" is meant opposed with respect to longitudinal axis $L_{axis}$ of detonation tube 101 (or the z-axis). Specifically, sidewall fuel-air injectors 130/ports 131, on the one hand, and sidewall purge air injectors 140/ports 141, on the other hand, may be positioned symmetrically about longitudinal axis $L_{axis}$. This symmetry could take the form illustrated in the V shaped arrangement of FIG. 3, where sidewall fuel-air injectors 130/ports 131 are disposed at an angle of 45 degrees counterclockwise from the vertical (y-axis), and sidewall purge air injectors 140/ports 141 are disposed at an angle of 45 degrees clockwise from the vertical (y-axis), resulting in a separation of 90 degrees between the two sets of injections/ports. Alternatively, the symmetry could be such that each set of injectors/ports is inclined at an angle of 90 degrees from the vertical, such that the two sets are separated by 180 degrees. Other arrangements of (relationships between) the sidewall fuel-air injectors 130/ports 131 and the sidewall purge air injectors 140/ports 141 are possible, as will be understood by one of ordinary skill in the art.

(FIG. 2 illustrates sidewall purge air ports 141 located at head manifold 105, DDT section 106, and central flanges 208. As noted above, sidewall fuel-air ports 131, although not visible in FIG. 2, are located at positions along longitudinal axis $L_{axis}$ corresponding to the positions of sidewall purge air ports 141. Accordingly, sidewall fuel-air ports 131 would also be located at head manifold 105, DDT section 106, and central flanges 208. In this regard, it may be noted that while FIG. 1 depicts a schematic representation of sidewall injectors 130, 140, the locations of sidewall injectors 130, 140 along sidewall 124 indicated in FIG. 1 are not necessarily drawn to scale, i.e., are not necessarily accurate. For example, sidewall injectors 130, 140 are not necessarily located at orifice plates 161 (orifice plates 161 are explained below).)

The injection, or flow, of the purge air from purge air chamber 120, through sidewall purge air injectors 140/sidewall purge air ports 141 (and optionally endwall purge air injector 142/endwall purge air port 143), to detonation tube 101 is controlled by sidewall purge air valves 144 (and, if applicable, endwall purge air valve 145). Sidewall purge air valves 144 are contained in a housing 128 therefor, and endwall purge air valve 145, if present, is contained in a housing 129 therefor. Valves 144, 145 may be driven, respectively, by motors 146, 147. In turn, motors 146, 147 may be controlled, respectively, by controllers 148, 149. Although FIG. 1 depicts each motor-controller pair 146/148 and 147/149 as being located together in a single unit, each controller 148, 149 may be located remotely from its associated motor 146, 147. Remote computerized control of motors 146, 147 and controllers 148, 149 may also be implemented. The operation of the purge air valve system (i.e., valves 144, 145, motors 146, 147 and controllers 148, 149) will be described below.

Operation of the fuel-air and purge air valve systems will now be described. According to some embodiments, each set of sidewall valves 134, 144 is a rotary valve system, where each system includes a rotary valve for each of the associated sidewall injectors 130 or 140. Each of the two sidewall rotary valve systems 134, 144 may operate independently of the other, although, as explained below, they may be driven/controlled in a coordinated manner. Such a rotary valve system may be configured so that all of its individual rotary valves operate together in uniform fashion, or so that each of its individual rotary valves operates independently. In the former case, all of the individual valves in the system may be effectively mounted on a rotating shaft or the like. In the latter case, as will be explained later, the individual valves may be driven/controlled in a coordinated manner.

Each sidewall rotary valve system 134, 144 is driven independently by its own motor 136 or 146. According to some embodiments, motors 136, 146 may be stepper motors, which drive the sidewall rotary valve systems 134, 144 in steps (increments). Stepper motors may facilitate computerized control of the motors. Where the individual valves are mounted on a shaft, driving the rotary valve system rotates the shaft and hence all of the individual valves together. Each individual valve has an open position in which fluid may flow through the valve, and a closed position in which fluid may not flow through the valve, as explained as follows. As indicated schematically in FIG. 1, the valves are located in the middle of sidewall injectors 130 or 140, between fuel-air mixing chamber 110 or purge air chamber 120 and detonation tube 101. In this regard, each of injectors 130, 140 may comprise two discrete supply/injection tubes or the like, one between fuel-air mixing chamber 110 or purge air chamber 120 and the valve, and one between the valve and detonation tube 101, as suggested schematically by FIG. 1. Each of the individual valves may have two diametrically opposed openings, i.e., openings positioned 180 degrees apart from each other. When the valve is rotated, these two diametrically opposed openings rotate about a circular path, remaining 180 degrees apart from each other. Each injector has an opening at the junction with the valve on the detonation tube 101 side of the valve, and an opening at the junction with the valve on the other side (i.e., the fuel-air mixing chamber 110 or purge air chamber 120 side) of the valve, and these two openings of the injector are aligned with each other. When the two diametrically opposed openings of the valve are aligned with the two openings of the injector, the valve is open, and fluid may flow through the valve, from the fuel-air mixing chamber 110 or purge air chamber 120 side of the valve to the detonation tube 101 side of the valve. When the two diametrically opposed openings of the valve are completely unaligned with the two openings of the injector, the valve is completely closed, and fluid may not flow through the valve.

The two openings of the injector, at the two junctions with the valve, may be circular. The diametrically opposed openings of the valve may each have an elongated shape such as an elongated circle, that is, the shape formed by replacing the two short sides of a rectangle with two semi-circles to form a closed, completely convex shape. By using such elongated shape rather than a circle, the valve is able to be transitioned more quickly from a closed to an open state and vice versa. That is, the transitions between open and closed states correspond more closely to a square wave than to a sine wave. Or in still other words, the valve is able to function more like an on-off (open-close) switch, as against effecting a gradual transition between the open and closed states (like a dimmer switch).

The rotary valves may be driven in accordance with the PDE operating cycle as follows. The valve is in an open state two times during every (360 degree) rotation. Thus, 180 degrees of rotation corresponds to one operating cycle. The sidewall fuel-air rotary valves 134 and the sidewall purge air rotary valves 144 are driven in coordinated fashion, as explained below. The following cycle is described in terms of the sidewall fuel-air valves (of sidewall fuel-air rotary valve system 134). The first 60 degrees of rotation may be used to provide for a fill stage (the valves are opened and the fuel-air mixture is injected into detonation tube 101), and the closing of the valves. The next 60 degrees of rotation may be allotted for DDT and blowdown (generation and propagation of detonation wave) with the valves in the closed position. During this second 60 degrees, the sidewall purge air rotary valves 144 are also closed. In the third 60 degrees of rotation, the valves remain closed, and the sidewall purge air rotary valves 144 are opened so as to perform purging of detonation tube 101. Then, the cycle repeats. During the cycle, a certain amount of time (corresponding to a certain amount of rotation) may be allowed to elapse after the fuel-air mixture is injected and before ignition is begun, for safety reasons. Safety mechanisms may be employed to ensure that during times other than the fill stage the sidewall fuel-air rotary valves 134 are closed.

The description of the operation of the valve system thus far has pertained to sidewall valves 134, 144. One or both of endwall fuel-air injection and endwall purge air injection may be employed in addition to sidewall fuel-air injection and sidewall purge air injection. It will be recalled that endwall valves 135, 145 are driven by associated motors 137, 147, controlled by controllers 139, 149. If endwall fuel-air injection and/or purge air injection is used, endwall valves 135 and/or 145 may be operated in synchronization with sidewall valves 134 and/or 144, to help quickly fill dead regions upstream of the upstream-most sidewall ports 131, 141.

As mentioned above, rotary valve system 134 or 144 may be configured so that all of its individual rotary valves operate together in uniform fashion, or so that each of its individual rotary valves operates independently. Thus far, the former case has been described. The latter case will now be described. As noted, even though the individual valves may operate independently, the individual valves may be driven/controlled in a coordinated manner.

Where the rotary valve system 134 or 144 is configured so that each of its individual rotary valves operates independently, it becomes possible to perform what may be referred to as phased injection. For the purposes of the instant disclosure, phased injection refers to injecting from different injectors at different times. Specifically, phased injection may be used for injecting the fuel-air mixture into detonation tube 101, and in particular for sidewall fuel-air injectors 130. Significantly, phased injection may be used to inject fuel-air mixture at a relatively downstream location in detonation tube 101 after (having commenced) injecting it at a relatively upstream location. To exemplify the most general case, if detonation tube 101 had only two sidewall fuel-air injectors 130, one located upstream of the other, fuel-air mixture may be injected from the more upstream sidewall fuel-air injector 130 at a first time and from the more downstream fuel-air injector at a second time, where the first time is earlier than the second time. (In general, it is possible but not necessary that injecting from the more upstream injector 130 be completed before the injecting from the more downstream injector 130 be commenced. It is necessary only that the injecting from the more downstream injector 130 commence after the injecting from the more upstream injector has commenced.) If detonation tube 101 had more than two sidewall fuel-air injectors 130, fuel-air mixture could be injected from the multiple sidewall fuel-air injectors 130 successively in an upstream-to-downstream order, i.e., fuel-air mixture could be injected first from the most upstream injector 130, then from the second most upstream injector 130, then from the third most upstream injector 130, and so on, until fuel-air mixture has been injected from each of injectors 130, from upstream-most to downstream-most, successively in that order. In addition, fuel-air mixture could be injected from endwall fuel-air injector 132, if used, prior to commencing the injection of fuel-air mixture from the upstream-most sidewall fuel-air injector 130. By performing such phased injection, i.e., temporally successive injection in upstream-to-downstream order, the fuel-air mixture may be provided to detonation tube 101 in a manner that is synchronized with the generation of the detonation and the downstream propagation of the detonation wave toward the downstream end 103 of detonation tube 101. Consequently, detonation can be enhanced and cycle time can be decreased, i.e., operating frequency can be increased.

Of course, to achieve phased injection of the sort described above requires controlling the timing of injection from the fuel-air injectors 130 and (if used) 132. This control is carried out by using controllers 138 (and 139) to drive motors 136 (and 137) to open and close the individual fuel-air valves 134 (and 135) of the individual injectors 130 (and 132) in the temporally successive upstream-to-downstream order described above. Such control of timing of opening and closing the valves 134 (and 135) could be carried out by computerized control and operation of controllers 138 (and 139) and motors 136 (and 137).

It should be understood alternatives to and/or modifications of the valving systems (valves, motors, controllers) and operations described above may be employed, as will be understood by one of ordinary skill in the art. For example, valves other than rotary valves such as described above may be used, motors other than stepper motors may be used, and so on. With regard to operation, for example, the purge stage may be commenced prior to the detonation wave exiting detonation tube 101, so as to shorten the purge time and hence the duration of the operating cycle, thus increasing operating frequency. As another example, the frequency at which the purge operation is performed may be reduced, e.g., to one time every other cycle (or, more generally, to less than one time per cycle) rather than one time every cycle, to increase the operating frequency. Other modifications and alternatives will be apparent to those of ordinary skill in the art.

Figure 5:
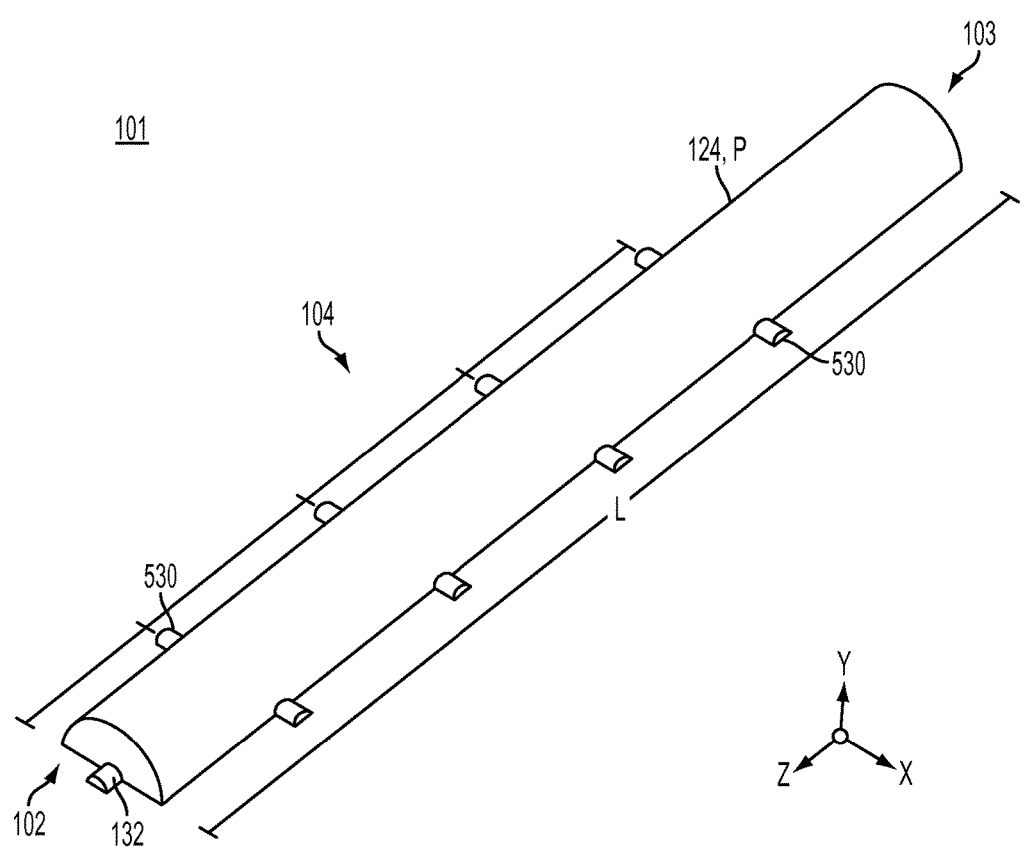
FIG. 5 is a schematic fragmentary perspective view of a detonation tube of a PDE in accordance with some embodiments.
Figure 6:
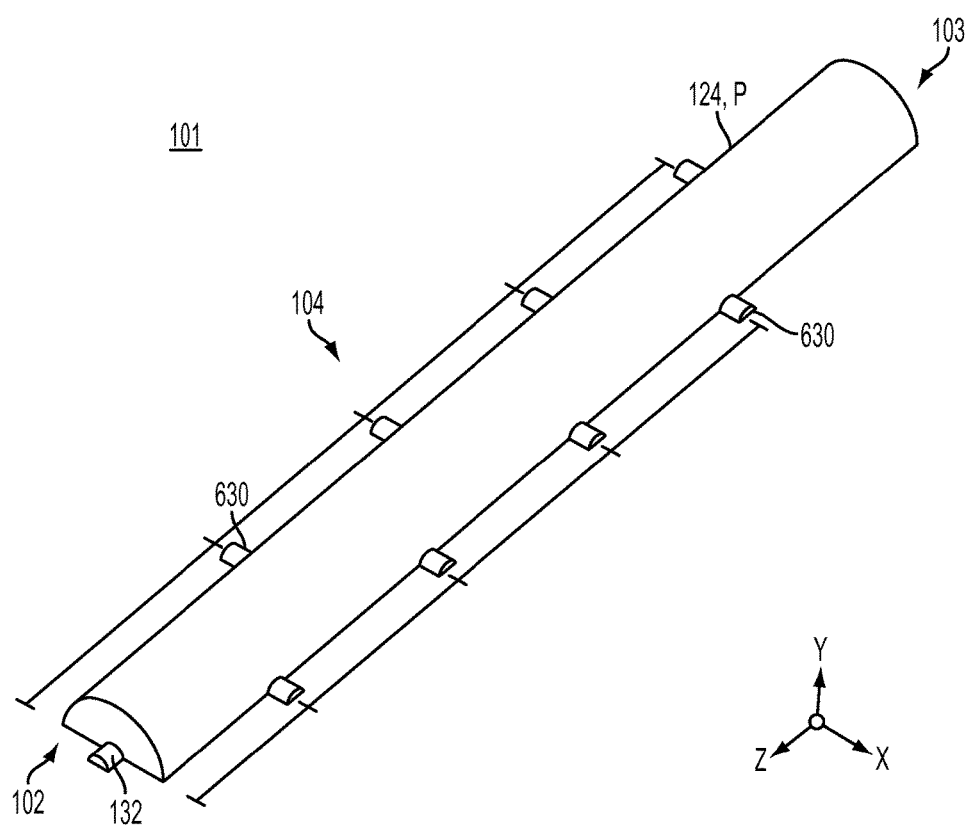
FIG. 6 is a schematic fragmentary perspective view of a detonation tube of a PDE in accordance with some embodiments, the detonation tube having staggered fuel-air injectors.
Figure 7:
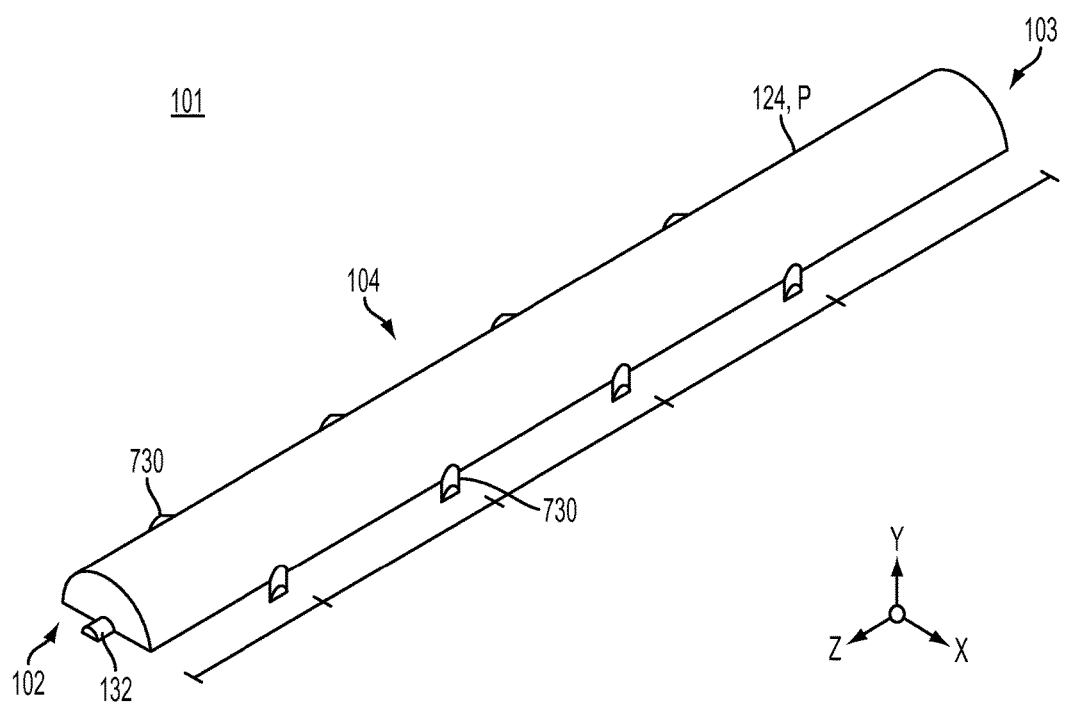
FIG. 7 is a schematic fragmentary perspective view of a detonation tube of a PDE in accordance with some embodiments, the detonation tube having fuel-air injectors inclined in a downstream direction.
Figure 8:
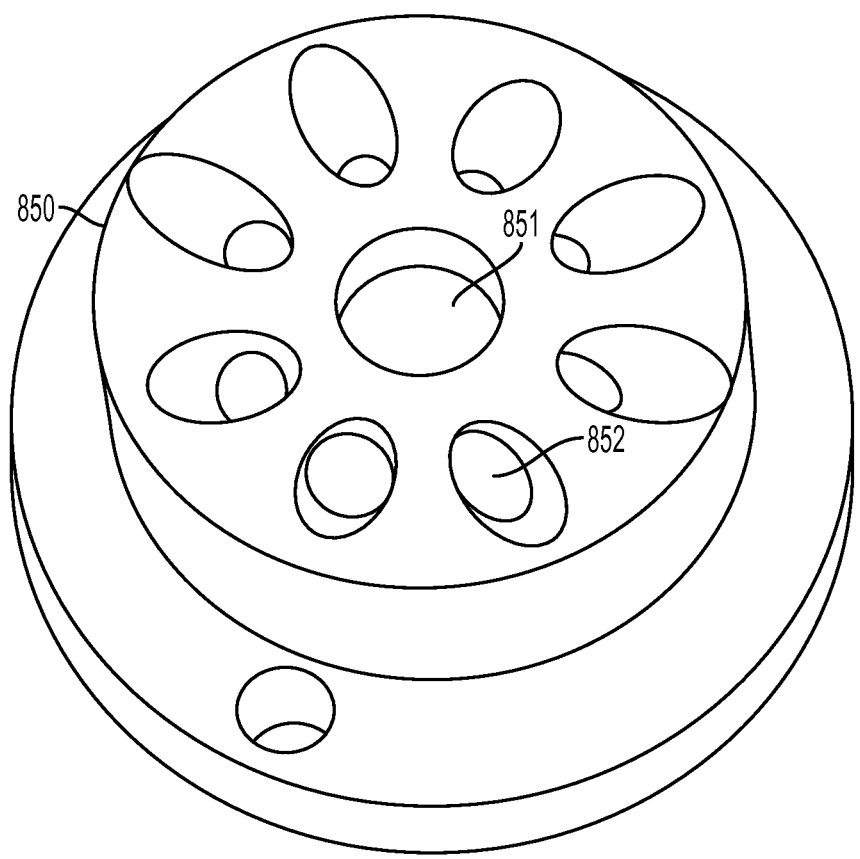
FIG. 8 is a perspective view of a "showerhead" orifice array of a PDE in accordance with some embodiments.
Figure 9:
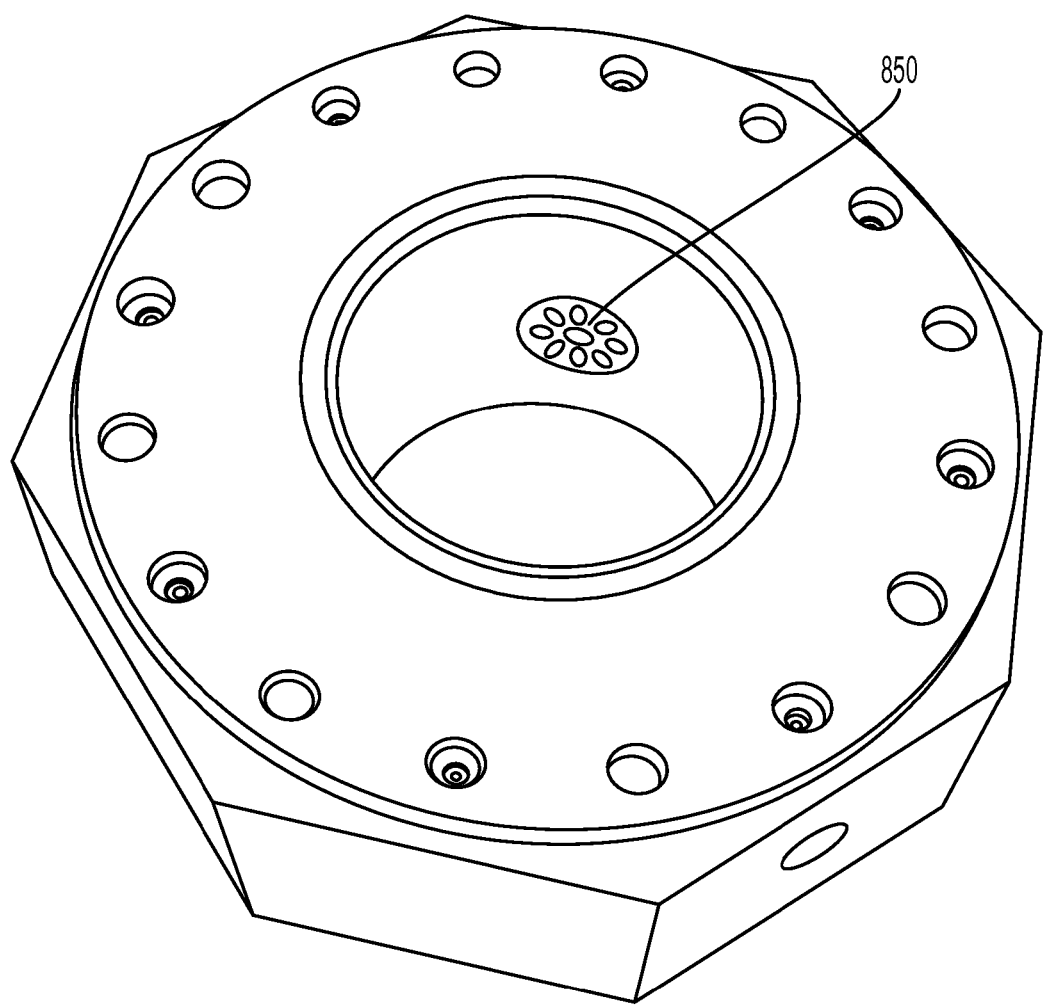
FIG. 9 is a perspective view of a "showerhead" orifice array seated in a section of a detonation tube of a PDE in accordance with some embodiments.
Figure 10:
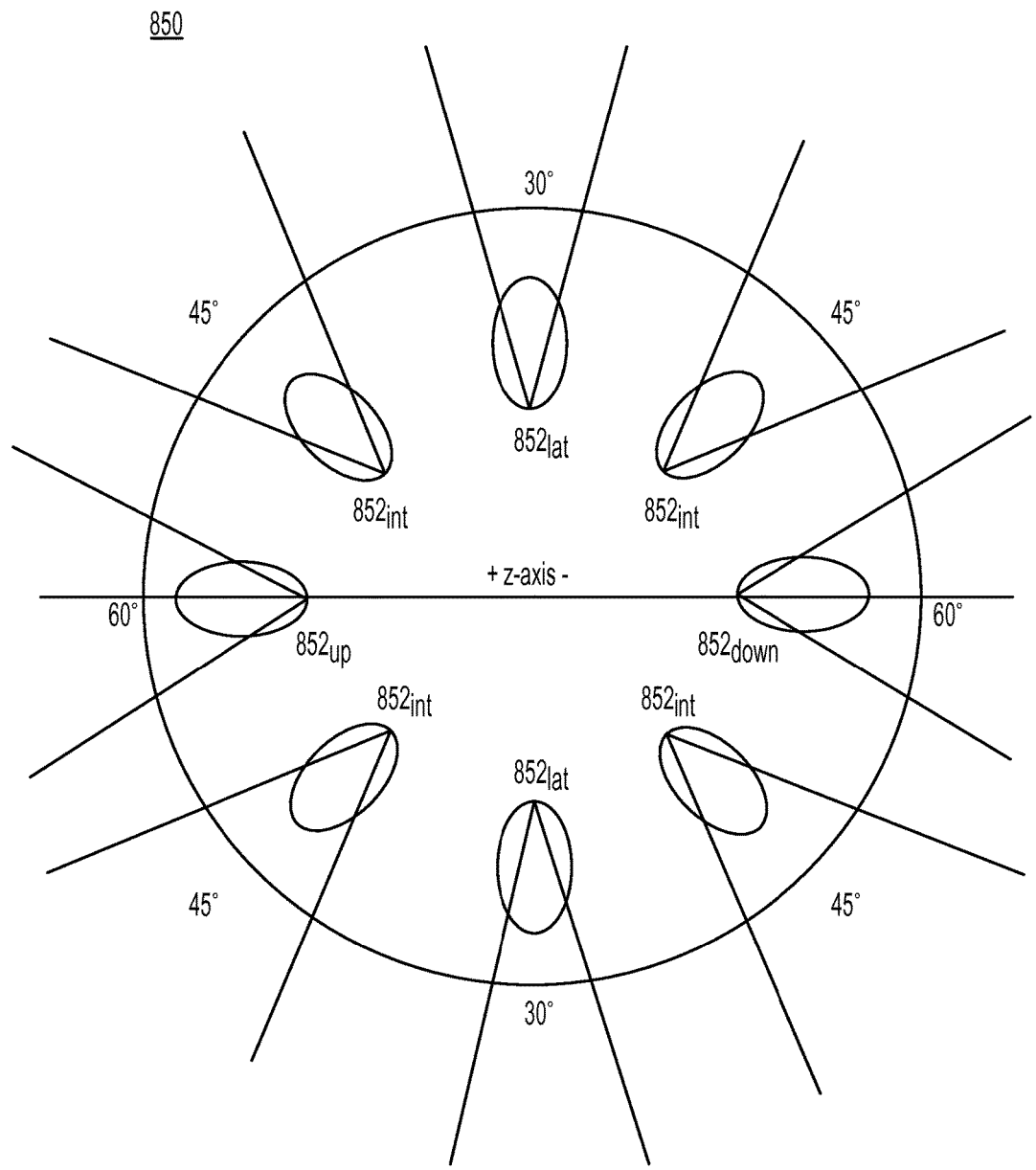
FIG. 10 is a schematic view of a "showerhead" orifice array of a PDE in accordance with some embodiments, illustrating directions of spray from the orifices thereof.

With reference to FIGS. 5-10, aspects of the sidewall injection of the fuel-air mixture and the purge air into detonation tube 101 will presently be described. FIG. 5 is a schematic fragmentary perspective view of a detonation tube of a PDE in accordance with some embodiments, the detonation tube having two rows of sidewall fuel-air injectors on opposite sides thereof. FIG. 6 is a schematic fragmentary perspective view of a detonation tube of a PDE in accordance with some embodiments, the detonation tube having staggered sidewall fuel-air injectors. FIG. 7 is a schematic fragmentary perspective view of a detonation tube of a PDE in accordance with some embodiments, the detonation tube having sidewall fuel-air injectors inclined in a downstream direction. FIG. 8 is a perspective view of a "showerhead" orifice array of a PDE in accordance with some embodiments. FIG. 9 is a perspective view of a "showerhead" orifice array seated in a section of a detonation tube of a PDE in accordance with some embodiments. FIG. 10 is a schematic view of a "showerhead" orifice array of a PDE in accordance with some embodiments, illustrating directions of spray from the orifices thereof.

Preliminarily, turning back to FIG. 1, it is seen that sidewall injectors 130, 140 may be disposed perpendicular to sidewall 124 (perpendicular to longitudinal axis $L_{axis}$ of detonation tube 101 or to the z-axis). More specifically, as seen in FIG. 3, sidewall injectors 130, 140 may also be inclined relative to the x-axis and relative to the y-axis, for example, at an angle of 45 degrees from the x-axis and 45 degrees from the y-axis. This is also evident from FIG. 2, where sidewall ports 131, 141 are disposed at the same 45 degree angles. In addition, as seen in FIGS. 1 and 3, sidewall fuel-air injectors 130/ports 131 and endwall fuel-air injectors 140/ports 141 are disposed opposite each other on detonation tube 101. That is, sidewall fuel-air injectors 130/ports 131 are disposed on fuel-air mixing chamber 110 side of detonation tube 101, while endwall fuel-air injectors 140/ports 141 are disposed on purge air chamber 120 side of detonation tube 101. However, alternatives to these arrangements of sidewall injectors/ports 130, 140/131, 141 may be employed. In one alternative, sidewall injectors 130, 140 may be inclined relative to only one of the x-axis and the y-axis. For example, sidewall injectors 130, 140 may be inclined at an angle of 90 degrees relative to the y-axis and not inclined relative to the x-axis, or alternatively may be inclined at an angle of 90 degrees relative to the x-axis and not inclined relative to the y-axis. Other alternatives to the arrangements of FIGS. 1-3 will now be discussed with reference to FIGS. 5, 6 and 7, which illustrate some of these other alternative arrangements.

Turning first to FIG. 5, two rows of sidewall fuel-air injectors 530 are provided on opposite sides of detonation tube 101 rather than one row on one side as in FIGS. 1-3. More generally, this two-row arrangement may be described by saying that two rows of sidewall fuel-air injectors 530 are provided at different positions in the direction of the perimeter (here, circumference) of detonation tube 101 (or of axially extended portion 104). More succinctly, this may be described by saying that the two rows of sidewall injectors 530 are provided at different angular positions on or along the perimeter of detonation tube 101. On the other hand, to describe this arrangement more specifically, in each of these two rows the sidewall fuel-air injectors 530 are disposed perpendicular to sidewall 124 (or to the z-axis) and also perpendicular to the y-axis, hence diametrically opposed to each other, i.e., separated by 180 degrees about sidewall 124 (axially extended portion 104). As the two rows of sidewall fuel-air injectors 530 are disposed in the +x and −x directions, they may be described as being at the east (+x) and west (−x) positions with respect to detonation tube 101. With this arrangement of sidewall fuel-air injectors 530, sidewall purge air injectors (not shown in FIG. 5) may similarly be provided in two rows on sidewall 124, the two rows being diametrically opposed to each other and located respectively at the north (+y) and south (−y) positions on detonation tube 101. Thus, the sidewall purge air injectors would be disposed perpendicular to sidewall 124 (or to the z-axis) and to the x-axis. Detonation tube 101 would then have four rows of sidewall injectors, one at each point on the compass (east, west, north, south), with the fuel-air injector rows alternating with purge air injector rows as one moves about the perimeter (here, circumference) of detonation tube 101. By increasing, e.g., doubling, the number of sidewall injectors, the fuel-air mixture and the purge air can be injected into detonation tube 101 more quickly, thus reducing the time of the fill and purge stages. Consequently, the operating cycle time can be decreased or, in other words, the operating frequency can be increased. (It will be noted that the rows of injectors may have different numbers of injectors than the numbers shown in FIG. 5, either greater or fewer, and may even have as few as one injector per row. Even if one injector may not be deemed sufficient in number to constitute a row, still the arrangement of FIG. 5, modified to have one injector per row, or rather per side, retains the characteristic of having at least two injectors located at different angular positions on the perimeter of detonation tube 101.)

Turning next to FIG. 6, as seen therein, the arrangement of FIG. 5 has been modified to be a staggered arrangement, as explained as follows. In FIG. 5, the individual sidewall fuel-air injectors 530 in the east row are respectively aligned, with respect to longitudinal axis $L_{axis}$ (or the z-axis), with their counterparts in the west row. That is, in FIG. 5, each row of sidewall fuel-air injectors 530 has four injectors, and the first (i.e., upstream-most) injector in the east row is aligned with (i.e., located at the same position in the z direction as) the first injector in the west row, the second injector in the east row is aligned with the second injector in the west row, and so on. In contrast, in FIG. 6, the individual sidewall fuel-air injectors 630 in the east row are not aligned, with respect to longitudinal axis $L_{axis}$ (or the z-axis), with their counterparts in the west row. Rather, the first injector in the east row is at a different position in the z-direction than the first injector in the west row, and so on. To be sure, in both FIGS. 5 and 6, the injectors in each row are equally spaced apart, and this spacing is the same for both rows. The staggered arrangement of the two rows in FIG. 6 may also be described as a zigzag pattern. In the arrangement of FIG. 6, two rows of sidewall purge air injectors (not shown in FIG. 6) may be provided at the north and south positions as in FIG. 5, but the two rows may be staggered as are the sidewall fuel-air injectors 630 in FIG. 6. In this sense, the arrangement of sidewall purge air injectors may deviate from that described with respect to FIG. 5 in the same way that the arrangement of sidewall fuel-air injectors 630 of FIG. 6 deviates from the arrangement of sidewall fuel-air injectors 530 of FIG. 5. In this sense, the arrangement of sidewall purge air injectors may be said to correspond to the arrangement of sidewall fuel-air injectors 630 of FIG. 6. By staggering the sidewall injectors, the fuel-air mixture and the purge air can be injected into detonation tube 101 over a greater portion of (i.e., at more different positions along the length of) detonation tube 101, such that detonation tube 101 may be able to be filled and purged more quickly. Accordingly, using a staggered arrangement may reduce the fill and purge times, and hence the duration of the operating cycle. In other words, the operating frequency may be increased. (It will be noted that the rows of injectors may have different numbers of injectors than the numbers shown in FIG. 6, either greater or fewer, and may even have as few as one injector per row. Even in the case of one injector per row, this arrangement may still be deemed staggered inasmuch as the one injector in one row (or on one side) is at a different position in the z-direction and a different angular position on the perimeter of detonation tube 101, than the one injector in the other row (or on the other side).)

Turning finally to FIG. 7, as seen therein, the arrangement of FIG. 5 has been modified in that sidewall fuel-air injectors 730 are inclined toward downstream end 103 of detonation tube 101. In FIG. 5, and in all the other arrangements of the sidewall injectors previously described herein, the sidewall injectors are perpendicular to longitudinal axis $L_{axis}$ (or the z-axis) and accordingly are inclined neither toward downstream end 103 nor toward upstream end 102 of detonation tube 101. In contrast, in FIG. 7, the sidewall fuel-air injectors 730 are inclined toward downstream end 103 in the sense that, considering the fluid flowing in injectors 730 toward detonation tube 101, or considering injector 730 itself as if it were a vector, the fluid motion or the injector as vector is made up of a component in the −x direction and a component in the −z direction (the + and − directions being indicated by the coordinate axes provided in FIG. 7). As seen in FIG. 7, the −z direction is the direction going toward downstream end 103, while the +z direction is the direction going toward upstream end 102. The −x (as well as +x, −y and +y) directions are neither upstream nor downstream. Sidewall purge air injectors may be provided in an arrangement corresponding to the arrangement of sidewall fuel-air injectors 730 shown in FIG. 7, that is, an arrangement deviating from that described above with respect to FIG. 5 in the same way that the arrangement of sidewall fuel-air injectors 730 of FIG. 7 deviates from the arrangement of sidewall fuel-air injectors 530 of FIG. 5. By inclining the injectors in the downstream direction, first, the flow of incoming fluid (fuel-air mixture or purge air) does not need to be turned by such a steep angle (namely, 90 degrees, from the perpendicular direction to the downstream direction) as compared to where the injectors are disposed perpendicular to sidewall 124/longitudinal axis $L_{axis}$/the z-axis. Second, adverse effects of the impinging flows from two opposing injectors (on either side of detonation tube 101) are reduced where the injectors are inclined in the downstream direction as compared to where the injectors are disposed perpendicular to longitudinal axis $L_{axis}$. Both of these factors mean that losses (drag) may be reduced in the case of downstream-inclined injectors as compared to the case of injectors disposed perpendicular to sidewall 124. Accordingly, with the downstream-inclined injectors detonation tube 101 may be able to be filled and purged more quickly, thus reducing the operating cycle time or, in other words, increasing the operating frequency. (It will be noted that the rows of injectors may have different numbers of injectors than the numbers shown in FIG. 7, either greater or fewer, and may even have as few as one injector per row. Moreover, the characteristic of inclining the injectors toward downstream end 103 may be applied to arrangements where there is only a single row of sidewall fuel-air injectors 130, such as illustrated in FIGS. 1-3, or even where there is only a single sidewall fuel-air injector 130.)

To be sure, the arrangements of sidewall injectors/ports described above with reference to FIGS. 1-3 and 5-7 should be taken as exemplary and not limiting, as one of ordinary skill in the art will appreciate that a wide range of further alternative arrangements, with regard to numbers, locations, orientations and the like of injectors and of injector rows may be employed.

While the discussion herein pertaining to injectors at times omits reference to ports, it is to be understood that ports, as the junctions between injectors or supply lines and chambers such as detonation tube 101, fuel-air premix chamber 110 and purge air chamber 120, may always be provided in association with injectors.

Figure 16:
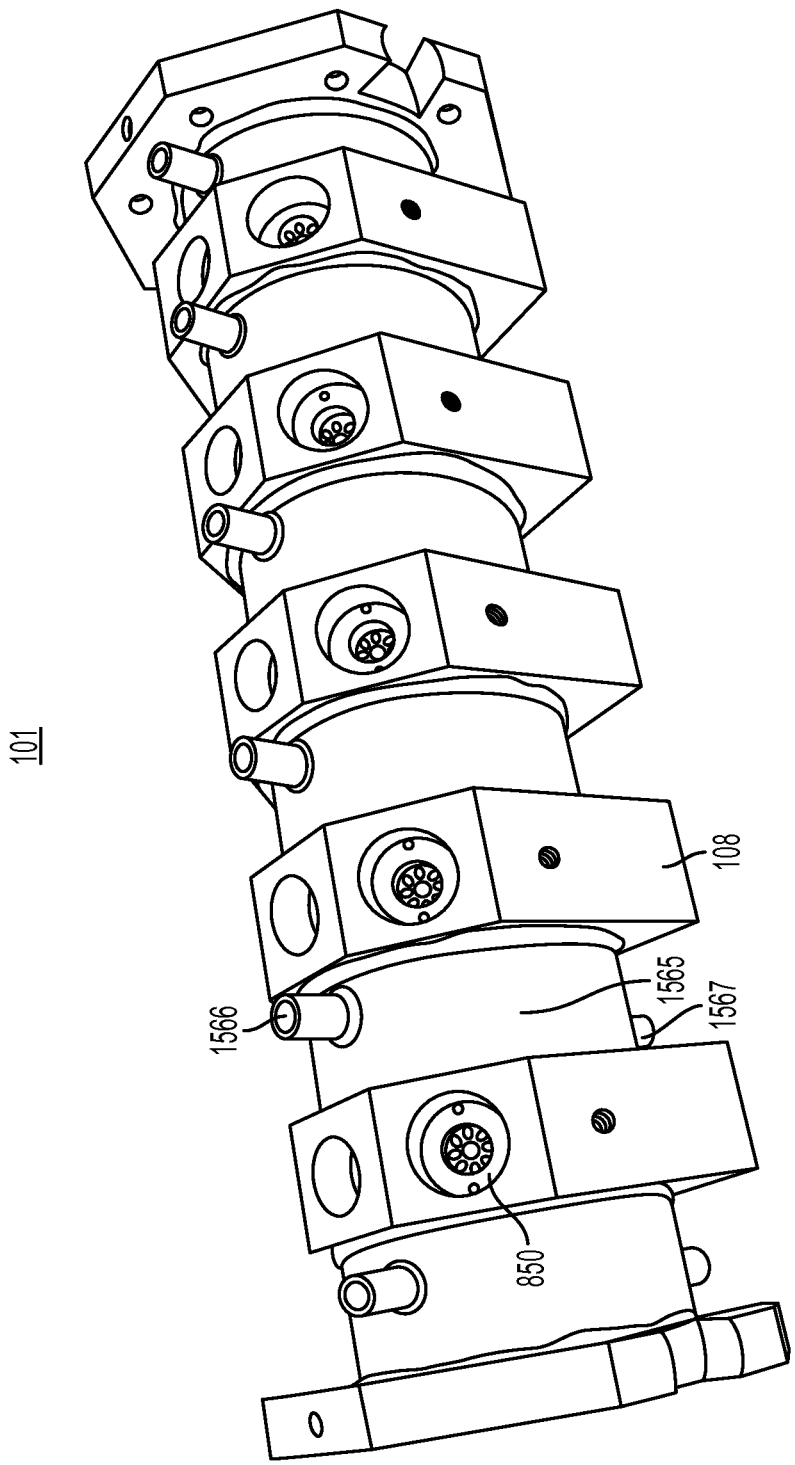
FIG. 16 is a perspective view of a detonation tube of a PDE with external sectional cooling jackets fitted thereon, in accordance with some embodiments.

With reference to FIGS. 8-10, aspects of injection orifices or nozzles will now be described. FIG. 8 illustrates a nozzle array or orifice array 850, which may be used in conjunction with injectors/ports and which may be deemed a part of any of the injectors or ports described herein. As seen in FIG. 9, which illustrates a section of detonation tube 101, orifice array 850 is seated in the perimeter wall of detonation tube 101. FIG. 9 illustrates orifice array 850 seated in the perimeter wall, as viewed from within detonation tube 101, while FIG. 16 illustrates orifice array 850 seated in the perimeter wall, as viewed from outside of detonation tube 101. Fluid may be injected from an injector via its associated port through orifice array 850 into detonation tube 101. Orifice array 850 may include a plurality of individual orifices. Such an orifice array may be referred to as having a "showerhead" design. The plurality of orifices may include a central orifice 851 and a plurality of additional orifices 852 arranged surrounding the central orifice in a shape that may be at least partly curved. As illustrated in FIG. 8, that shape may be a circle. As further illustrated, additional orifices 852 may be equally spaced apart along the perimeter (here, circumference) of the shape (here, circle).

As further illustrated, there may be eight additional orifices 852, although a smaller or larger number may also be provided. As seen in FIG. 10, of the eight additional orifices 852, the one that is located farthest upstream may be referred to as the upstream additional orifice $852_{up}$, and the one that is located farthest downstream may be referred to as the downstream additional orifice $852_{down}$. The two additional orifices 852 that are each 90 degrees away (along the circumference of orifice array 850) from each of the upstream and downstream additional orifices $852_{up}$ and $852_{down}$ may be referred to as lateral additional orifices $852_{lat}$. The other four additional orifices, which are each 45 degrees away from each of the upstream, downstream and lateral additional orifices, may be referred to as intermediate additional orifices $852_{int}$. (For convenience of illustration, central orifice 851 is omitted in FIG. 10.)

As seen in FIGS. 8 and 9, central orifice 851 may be circular and additional orifices 852 may each have a shape that is not a circle but is a completely convex, closed curve, e.g. an oval, ellipse, or the like. Additional orifices 852 may all have the same shape. Fluid injected through central orifice 851 may be injected in a radial direction, that is, perpendicular to sidewall 124. Fluid injected through the oval or oval-like additional orifices 852 may be injected in partly axial directions, that is, directions that have both radial and axial components. For example, as illustrated in FIG. 10: fluid injected through upstream additional orifice $852_{up}$ or downstream additional orifice $852_{down}$ may be directed in an upstream or downstream direction with the spray being ejected from the orifice with an angular extent of 60 degrees; fluid injected through lateral additional orifices $852_{lat}$ may be directed in lateral directions (perpendicular to the upstream and downstream directions) with the spray being ejected from the orifice with an angular extent of 30 degrees; and fluid injected through intermediate additional orifices $852_{int}$ may be directed in intermediate directions (45 degrees from the upstream or downstream direction and 45 degrees from one of the two lateral directions) with the spray being ejected from the orifice with an angular extent of 45 degrees. A conventional orifice may be circular and hence eject fluid simply in a radial direction. In contrast, additional orifices 852 eject fluid in different directions. Thus, orifice array 850 may serve to fill detonation tube 101 with fluid (fuel-air mixture or purge air) more uniformly and more quickly than would a conventional, circular orifice or an array of circular orifices.

It should be noted that orifice array 850 as illustrated in FIGS. 8-10 and described above is designed for injectors that are disposed perpendicular to sidewall 124, such as those depicted in FIGS. 1-3, 5 and 6. Where injectors are disposed in a fashion that is not perpendicular to sidewall 124, the shape of orifice array 850 would be modified in view of the different geometry of the junction of injector and detonation tube 101. Thus, for the case of the downstream-inclined injectors 730 depicted in FIG. 7, the shape of orifice array 850 would be modified to be an ellipse, elongated circle (as defined above) or similar shape rather than a circle.

Figure 11:
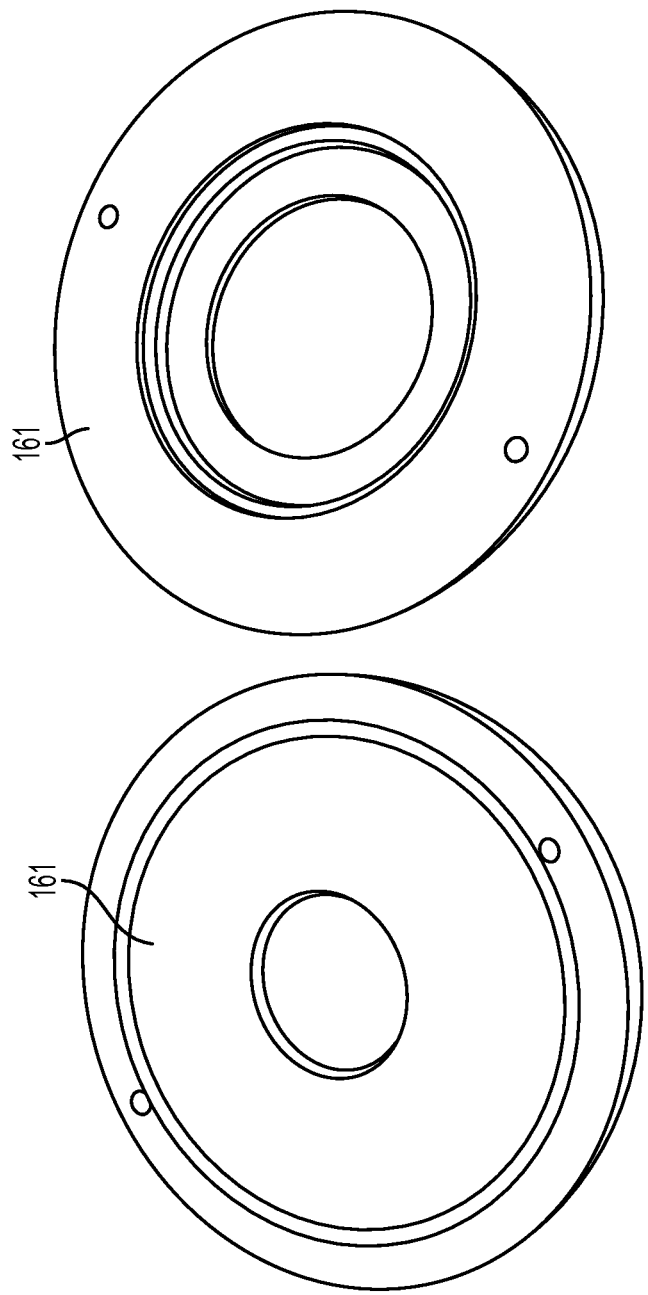
FIG. 11 is a perspective view of orifice plates of a PDE in accordance with some embodiments.

With reference to FIGS. 1 and 11, DDT section 106 will be described. FIG. 11 is a perspective view of orifice plates of a PDE in accordance with some embodiments.

PDE 100 may employ DDT devices to enhance detonability. The function of DDT devices, as promoting detonation by DDT, has been described above. As seen in FIG. 1, DDT section 106 includes two different types of DDT devices, namely, a Shchelkin spiral 160 and two orifice plates 161, which are located at either end of Shchelkin spiral 160. Shchelkin spiral 160 is subject to damage or destruction due to the high heat load during operation of PDE 100. Cooling (described below) of Shchelkin spiral 160 may be provided to mitigate this. According to some embodiments, Shchelkin spiral 160 is not included in PDE 100, but rather only the two orifice plates 161 are included. Orifice plates 161 create wave reflections between themselves and the closed end (upstream end 102) of detonation tube 101. These reflections may shorten the DDT distance. Also, orifice plates 161 can readily be fabricated with internal cooling passages (described below) to support sustained use thereof during operation of PDE 100.

FIG. 11 illustrates examples of orifice plates 161. Orifice plate 161 shown at left in the figure has a blockage ratio (extent to which the flow path is blocked) of 75% while orifice plate 161 shown at right in the figure has a blockage ratio of 50%. According to some embodiments, orifice plates 161 having a blockage ratio of about 50% may be used. According to other embodiments, the upstream orifice plate 161 has a blockage ratio of 75% and the downstream orifice plate 161 has a blockage ratio of 0% to 75%. As will be understood by one of ordinary skill in the art, other blockage ratios may be used, and other arrangements of DDT devices may be employed.

Figure 12:
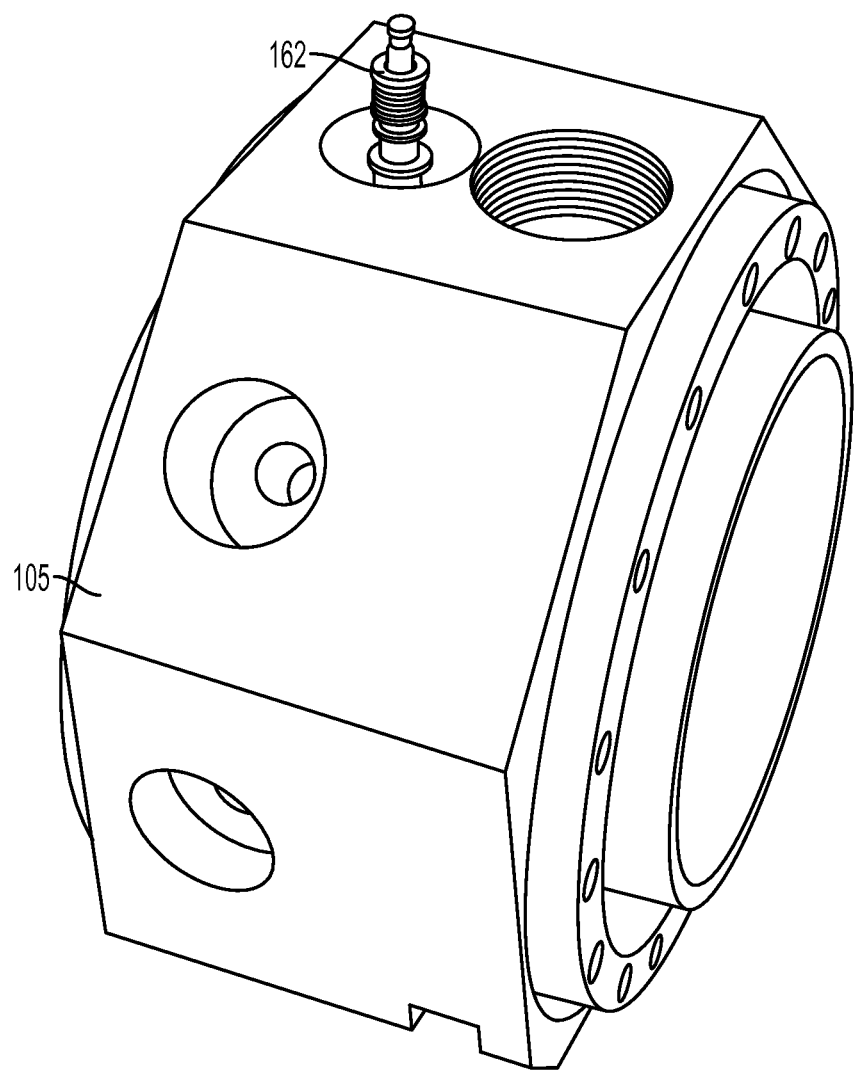
FIG. 12 is a perspective view of a head manifold of a PDE, including an igniter and holes for igniters, in accordance with some embodiments.
Figure 13:
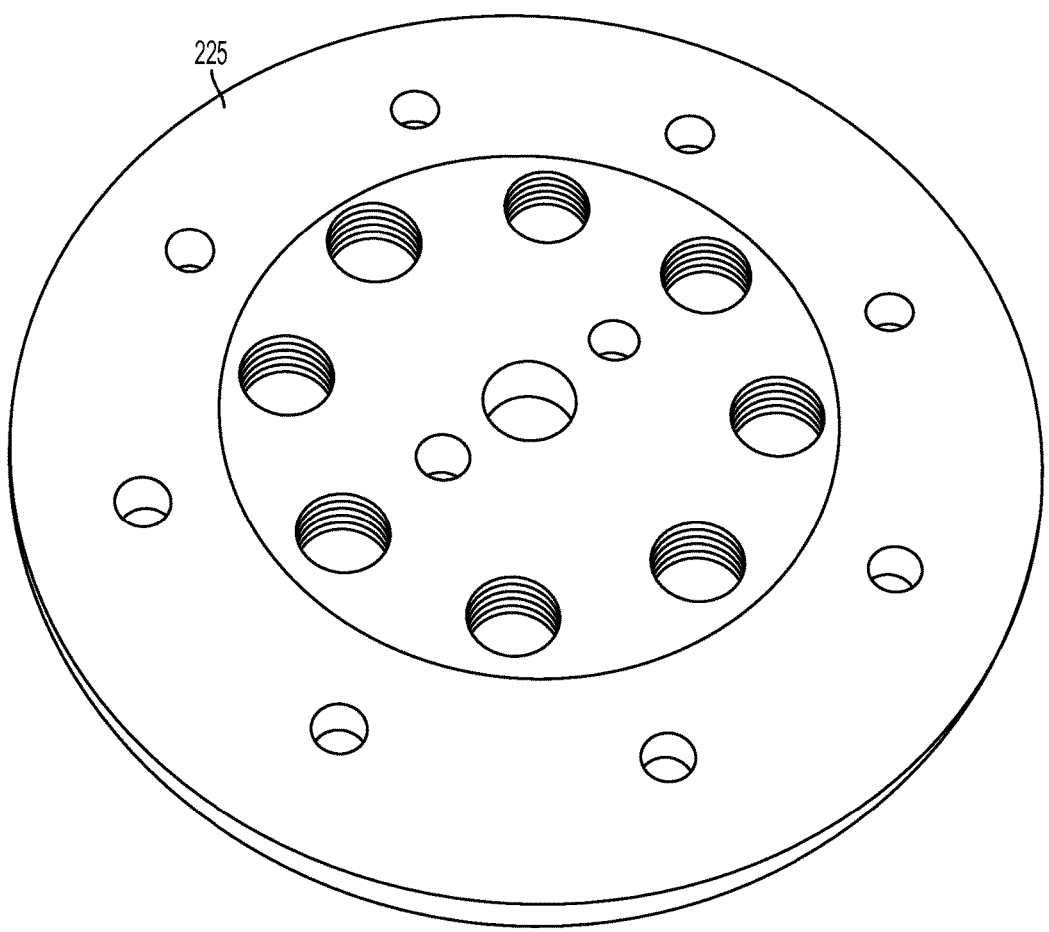
FIG. 13 is a perspective view of a back end plate of a head manifold of a PDE in accordance with some embodiments.
Figure 14:
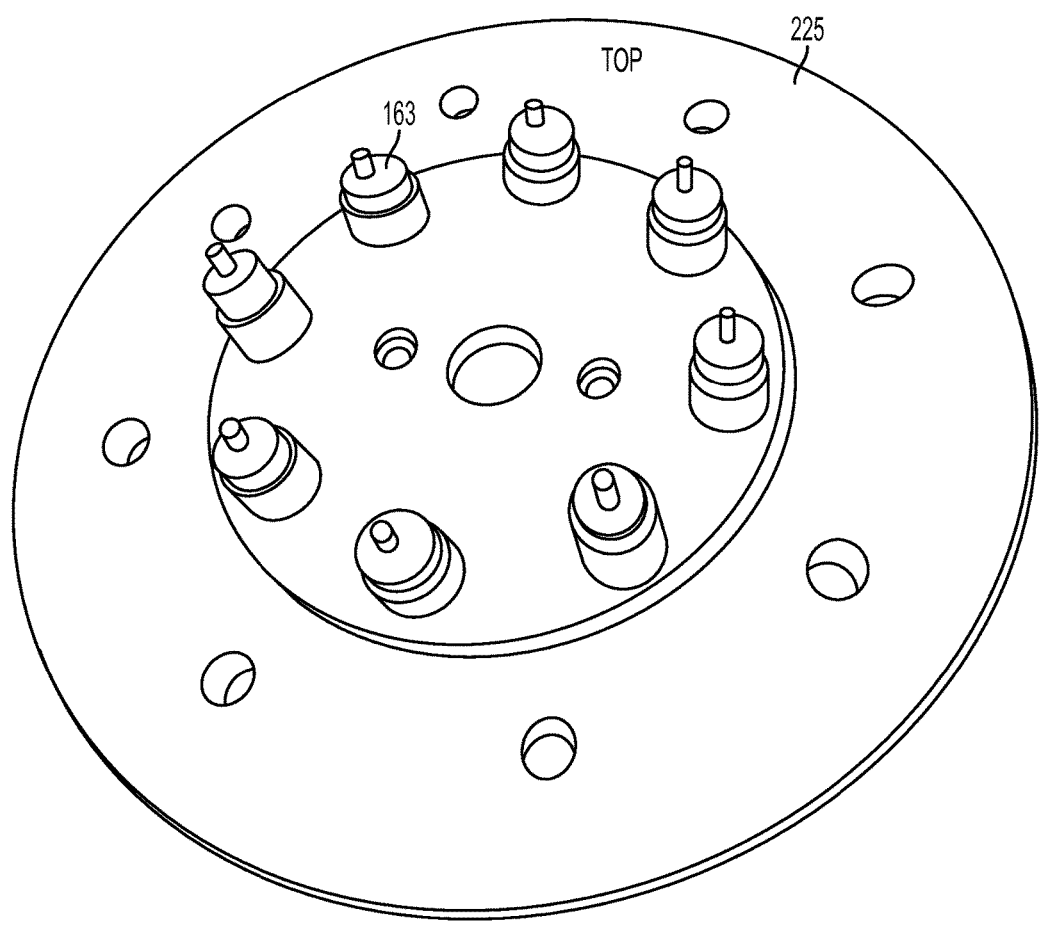
FIG. 14 is a perspective view of a back end plate of a head manifold of a PDE, including corona discharge electrodes, in accordance with some embodiments.

With reference to FIGS. 1-3 and 12-14, aspects of the ignition system of PDE 100 will be described. FIG. 12 is a perspective view of a head manifold, including an igniter and holes for igniters, of a PDE in accordance with some embodiments. FIG. 13 is a perspective view of a back end plate of a head manifold, illustrating holes for corona discharge electrodes, and holes for endwall injection of fuel-air mixture, purge air, and dopant, of a PDE in accordance with some embodiments. FIG. 14 is a perspective view of a back end plate of a head manifold, including corona discharge electrodes, and holes for endwall injection of fuel-air mixture, purge air, and dopant, of a PDE in accordance with some embodiments.

According to some embodiments, the ignition system includes a primary ignition system and a corona discharge system. The corona discharge system will be described later. Turning to FIGS. 1-3 and 12, the primary ignition system includes a high voltage spark generator (not illustrated) connected to a plurality of igniters 162, which may be spark plugs such as automotive spark plugs. Igniters 162 are located in head manifold 105 near upstream end 102, and may be arranged around the perimeter of head manifold, at evenly spaced intervals, as seen in FIGS. 2, 3 and 12 (FIG. 2 shows only the openings for igniters 162, not igniters 162 themselves, while FIG. 12 shows one igniter 162 seated in one of the openings for igniters 162). The spark generator simultaneously fires all the igniters 162. In the illustrated embodiments, there are eight igniters 162.

As mentioned, the amount of energy required for direct initiation of detonation by the ignition is difficult to achieve. However, even when DDT is used to initiate detonation, a higher ignition energy, albeit short of that required for direct initiation, is desirable to assist in DDT. But such high energy tends to wear away or destroy the igniters 162. The arrangement described above resolves this dilemma, as it can provide adequate energy without destroying the igniters 162. That is, by employing a plurality of (e.g., eight) igniters 162, the total energy delivered is increased without increasing to such an extent the energy at any individual igniter 162. In addition, by arranging the igniters 162 around the circumference of detonation tube 101, a toroidal imploding wave is generated that can facilitate detonation. Thus, this arrangement of igniters 162 represents a way to enhance detonation, without requiring extremely high ignition energy.

As illustrated in FIGS. 1, 2, 13 and 14, the corona discharge system may include a plurality of corona discharge electrodes 163, disposed in the back end plate 225 (upstream end) of head manifold 105. (For simplicity, corona discharge electrodes 163 may be referred to as corona electrodes 163.) Corona discharge electrodes 163 may be disposed in a circular arrangement at evenly spaced intervals, as illustrated in FIGS. 2, 13 and 14. (FIG. 13 illustrates back end plate 225 of head manifold 105 with the openings for corona discharge electrodes 163, while FIGS. 2 and 14 illustrate back end plate 225 of head manifold 105 with corona discharge electrodes 163 seated in the openings. In FIG. 2, the unnumbered rods spaced about the circumference of back end plate 225 and surrounding corona discharge electrodes 163 are for aligning head manifold 105, DDT section 106 and upstream end flange portion 209.) In the illustrated embodiments, there are eight corona discharge electrodes 163. Energizing the corona discharge electrodes 163 generates a plasma, ionizing the air in the vicinity of igniters 162. This reduces the amount of voltage (energy) required to initiate a spark, leading to a faster electrical discharge and a more powerful ignition event. In this way, the corona discharge system facilitates detonation.

Head manifold 105 may be designed to have a large cavity to hold igniters 162 and corona discharge electrodes 163 followed (downstream) by a smaller diameter chamber that attaches to the rest of detonation tube 101. In this way, igniters 162 and corona discharge electrodes 163 are protected from shocks or detonation waves that emanate from upstream in detonation tube 101. It is also noted that the numbers and arrangements of igniters 162 and corona discharge electrodes 163 may be varied and modified from those described above, as will be understood by one of ordinary skill in the art. Furthermore, according to some embodiments, the corona discharge system is omitted.

Another way to enhance detonation without requiring extremely high ignition energy is to use a predetonator or alternatively to provide an enriched region at the ignition location, that is, a region enriched with an energetic material to promote detonation. According to some embodiments, PDE 100 includes a dopant supply line 164 for supplying such energetic material (dopant) from a dopant supply (not illustrated) to detonation tube 101 at upstream end 102 near igniters 162. This dopant injection system may include a valve system (valve, motor, controller) as is the case for fuel-air injection and purge air injection. The dopant may be injected into detonation tube 101 selectively, e.g., as conditions warrant it or not. With reference to FIGS. 13 and 14, any of the three central holes of back end plate 225 of head manifold 105 may serve as a port for injection of dopant into detonation tube 101. (Any of these three central holes may also serve as an endwall fuel-air port 133 or as an endwall purge air port 143.) As energetic material (dopant), hydrogen, oxygen or any of a range of other energetic materials may be used, as will be understood by one of ordinary skill in the art. According to some embodiments, the dopant supply, dopant supply line and accompanying elements are omitted.

Figure 15:
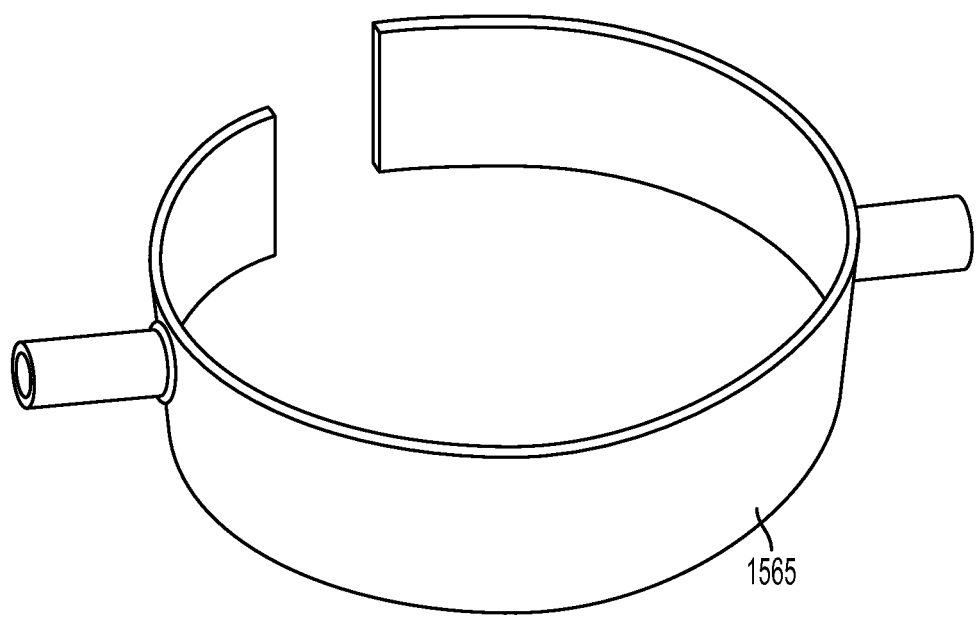
FIG. 15 is a perspective view of an external sectional cooling jacket of a PDE in accordance with some embodiments.

With reference to FIGS. 2, 15 and 16, aspects of the cooling system of PDE 100 will be described. FIG. 15 is a perspective view of an external sectional cooling jacket of a PDE in accordance with some embodiments. FIG. 16 is a perspective view of a detonation tube of a PDE with external sectional cooling jackets fitted thereon, in accordance with some embodiments.

PDE 100 may be provided with a cooling jacket or cooling envelope to cool detonation tube 101. Cooling serves to maintain PDE 100 for sustained operation, e.g., to prevent damage due to prolonged intense heat, and also to prevent undesirable autoignition of reactants. More effective and more rapid cooling supports operation of PDE 100 at higher frequency.

The cooling jacket or envelope may be made up of sectional cooling jackets or envelopes provided for different individual sections of detonation tube 101. FIG. 15 illustrates an example of such a sectional cooling jacket 1565. FIG. 16 illustrates detonation tube 101 with a plurality of sectional cooling jackets 1565 fitted around sections of detonation tube 101 that are between flanges. Sectional cooling jacket 1565 includes a fluid inlet 1566, an internal flow channel (not illustrated) and a fluid outlet 1567. Cooling fluid enters fluid inlet 1566, flows through the internal flow channel and exits from fluid outlet 1567. The internal flow channel extends 180 degrees around the perimeter (here, circumference) of detonation tube 101, from fluid inlet 1566 at the top to fluid outlet 1567 at the bottom, as will be understood from FIG. 16.

Sectional cooling jacket 1565 may be referred to as an external sectional cooling jacket, by virtue of its construction as a separate piece (FIG. 15) that can be added onto detonation tube 101 (FIG. 16). In contrast, sections of detonation tube 101 may be provided with what may be termed internal sectional cooling jackets. In particular, head manifold section 105, DDT section 106 (or Shchelkin spiral 160 and orifice plates 161), and central flanges 208 may each be fabricated with an internal sectional cooling jacket instead of external sectional cooling jacket 1565. Such internal sectional cooling jacket may be similar in configuration to external sectional cooling jacket 1565, that is, with fluid inlet at the top, flow channel extending 180 degrees around the perimeter, and fluid outlet at the bottom. In that regard, the holes at the top of head manifold 105, DDT section 106, and central flanges 208 illustrated in FIG. 2 are the locations of the fluid inlets of the internal sectional cooling jackets of those elements.

According to some embodiments, water, such as ordinary low pressure water, is used as the cooling fluid. Alternatively, in the case of high heat flux, for example, if PDE 100 is operating at high frequency, water from a high pressurized source may be used. According to some embodiments, fuel may be used as the cooling fluid, for example, in aerospace applications. Other arrangements and modifications of the cooling jackets, e.g., of the fluid inlet, fluid outlet, flow channels, and cooling fluid are possible, as will be understood by one of ordinary skill in the art. For example, the flow channel may extend over more than 180 degrees of the perimeter of detonation tube 101, or it may extend in an axial direction (direction of longitudinal axis $L_{axis}$/z-axis). Other variations are possible.

Additional cooling elements may be provided for parts of PDE 100 other than detonation tube 101, as will be understood by one of ordinary skill in the art, e.g., fans and/or fins to cool the motors used to drive the valves for the injectors.

PDE 100 may include a number of other elements, among them various safety-related features. For example, respective gas supply lines may be provided to supply a gas such as nitrogen from a supply thereof to detonation tube 101, fuel-air mixing chamber 110, and purge air chamber 120, for purging and inerting these chambers at the end of hot firing and for extinguishing any backfire that may occur therein. As another example, accumulators or surge tanks to accommodate pressure rises and dampen fluctuations, pressure regulators, pressure relief valves and the like may be provided appurtenant to chambers containing gas under pressure. Likewise, emergency shutoff switches, measuring devices (sensors, gauges, etc.), and other components may be provided as appropriate for safety, monitoring, measuring performance and operating parameters, and other functions. Additional elements, safety-related and otherwise, may be provided in PDE 100, as will be understood by one of ordinary skill in the art.

Figure 17:
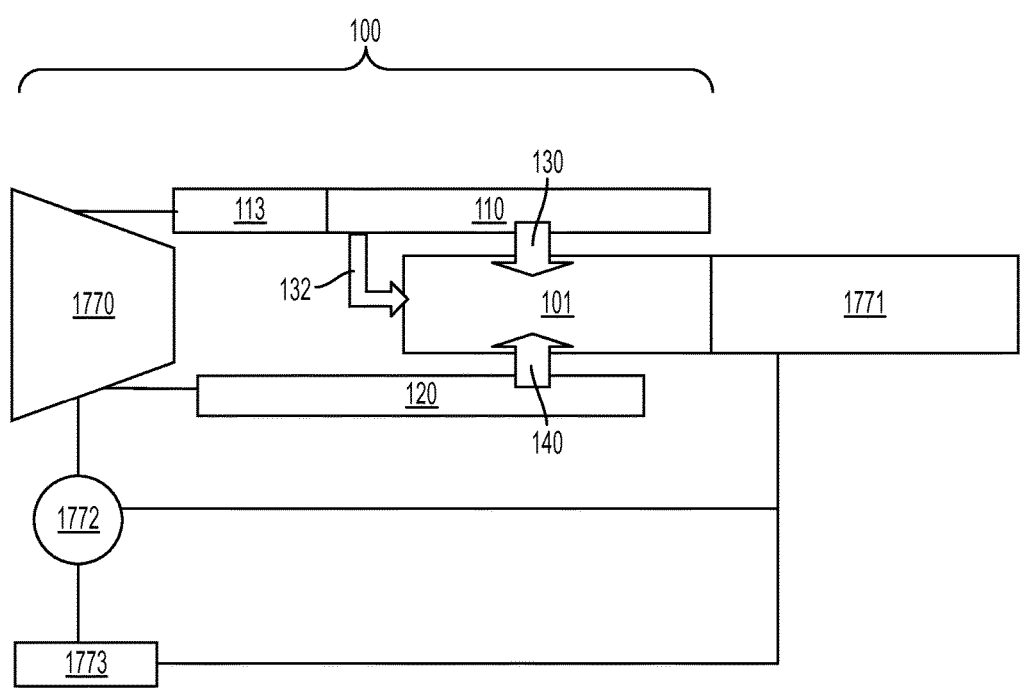
FIG. 17 is a schematic view of a PDE including additional elements associated with the PDE in accordance with some embodiments.

FIG. 17 illustrates, in a schematic and abbreviated depiction, additional elements that may be associated with PDE 100 in some practical applications, in accordance with some embodiments. It will be noted that many of those elements of PDE 100 that have already been discussed above are omitted in the abbreviated depiction provided in FIG. 17. As seen in FIG. 17, according to some embodiments, PDE 100 may include an air intake or fan 1770 to drive in air (for the fuel-air mixture and for the purge air) and increase the pressure of the incoming air to a pressure suitable for use by PDE 100, e.g., approximately 75 psi, as explained above. According to some embodiments, the thrust generated by PDE 100 may be used to drive a generator 1771. Fan 1770 may be driven by a motor 1772, which may be powered by a battery 1773 and/or by generator 1771 (or by another power source). Battery 1773 may also be charged by generator 1771. Generator 1771 may be a linear electric power generator. Such a generator may operate using a compound mass/spring system (not illustrated) including a heavy piston connected to a light piston by a spring. The heavy piston is located toward downstream end 103 of detonation tube 101. The spring is located downstream of the heavy piston, and the light piston is located downstream of the spring. Energy is transferred from the detonation waves to the linear generator via the mass/spring system. The light piston includes permanent magnets and oscillates in the downstream and upstream directions, moving through stationary electrical coils, while the heavy piston serves as an energy reservoir, storing energy. The heavy and light pistons are optimized according to various parameters to efficiently transfer energy. In this arrangement, venting of detonation tube 101 is provided by openings or flaps that open and close (not illustrated), disposed in sidewall 124 of detonation tube 101 near the downstream end thereof.

According to some embodiments, in addition to power generation, PDE 100 may be used in conjunction with regeneration or cogeneration systems (e.g., fuel cells, heating water to generate electricity, etc.).

According to some embodiments, in addition to power generation, PDE 100 may be used for air, terrestrial or marine propulsion. PDE 100 may be fabricated as a compact device, which is portable for use as a mobile source of power, such as an emergency generator in the field. As for air propulsion, PDE 100 may be used in both subsonic and supersonic flight applications. One challenge in flight applications is finding a material for detonation tube 101 that can withstand the harsh thermal and stress environment. As an example of suitable materials, the outer wall of detonation tube 101 could be made of copper, and the inner wall could be coated with a thin layer of either aluminum oxide or silicon carbide. As mentioned, in flight applications detonation tube 101 may be fuel-cooled rather than water-cooled as described above. Flight applications, among others, may be supported by the use of a PDE having multiple detonation tubes.

Figure 18:
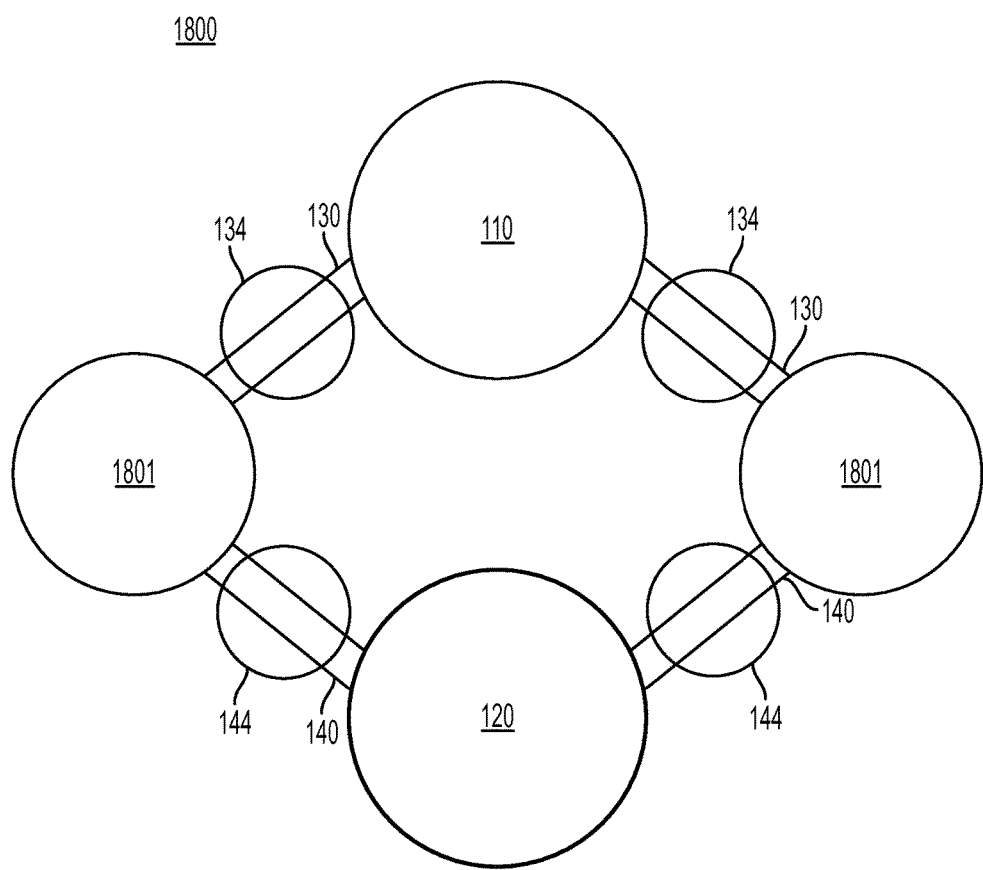
FIG. 18 is a schematic view of a PDE having multiple detonation tubes, in accordance with some embodiments.

FIG. 18 illustrates, in an abbreviated depiction, a PDE 1800 having multiple detonation tubes 1801, in accordance with some embodiments. While PDE 1800 has two detonation tubes 1801, this arrangement could readily be modified to incorporate a larger number of detonation tubes 1801. FIG. 18 illustrates a convenient physical arrangement of detonation tubes 1801, with fuel-air mixing chamber 110 and purge air chamber 120 each disposed between both detonation tubes 1801 in a diamond shaped or V-plus-inverted-V shaped arrangement. Alternative physical arrangements are possible, as will be appreciated by one of ordinary skill in the art. Of course, injectors, valves, and the like for each of fuel-air mixing chamber 110 and purge air chamber 120 would have to be provided in duplicate, to accommodate the two detonation tubes 1801. In the arrangement of FIG. 18, the operation of the two detonation tubes 1801 could be synchronized in a two-stroke cycle. When one of the two tubes 1801 is detonating, the other one can be purging, and vice versa. This way, the two-tube apparatus is more constantly or more frequently producing power, as compared to a single-tube arrangement. That is, during a given cycle time $t_{cyc}$, the single-tube arrangement has one power producing stage, whereas the two tube arrangement would have two power producing stages, one in one tube 1801 during the first half of $t_{cyc}$ and one in the other tube 1801 during the second half of $t_{cyc}$. Thus, the two-tube arrangement produces more power per unit time than the single-tube arrangement. From the point of view of the amount of power produced, the two-tube arrangement is equivalent to doubling the operating frequency of the single-tube arrangement. In addition to the increased power output, the effective increased operating frequency means that the power outputted will be steadier over time, which facilitates use of PDE 1800 to drive a generator or the like, as it reduces the need to smooth out cyclic fluctuations in power output. As mentioned, PDE 100 could be modified to include a greater number of detonation tubes 1801, as will be appreciated by one of ordinary skill in the art. Along the lines of the above explanation, using a greater number of tubes 1801 would result in an even greater effective operating frequency, with attendant advantages.

Figure 19:
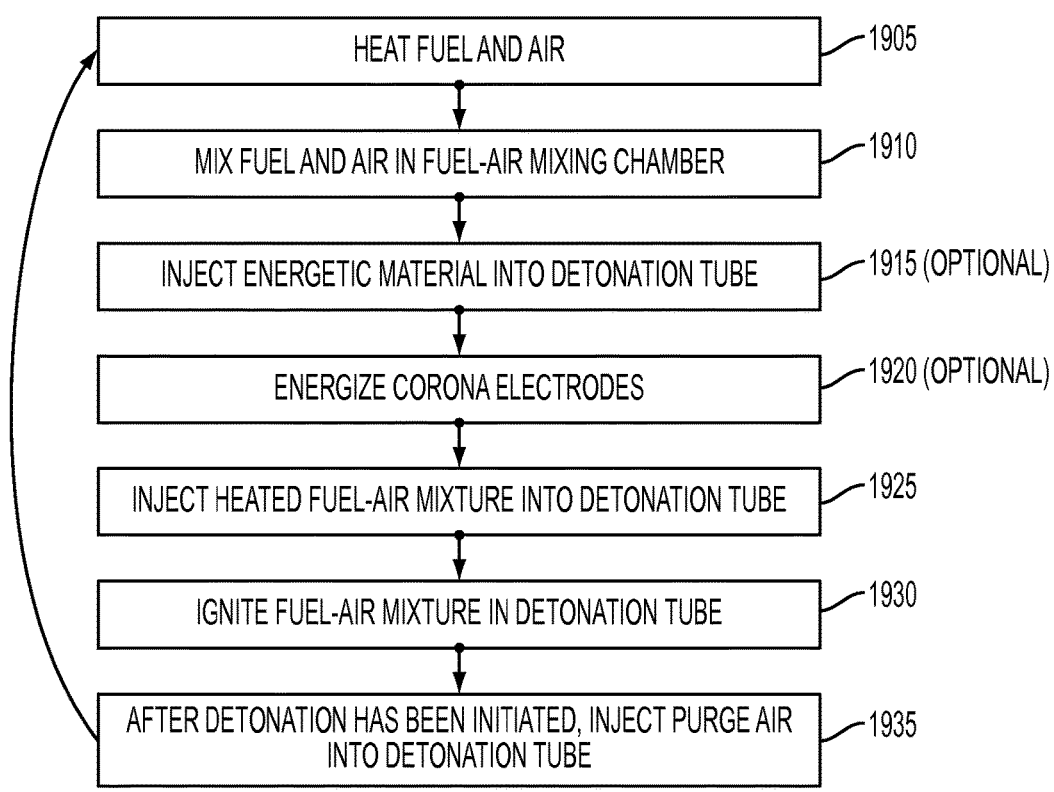
FIG. 19 is a flow chart of a method of operating a PDE, in accordance with some embodiments.

With reference to the flow chart of FIG. 19, a method of operating a PDE will be described, in accordance with some embodiments. At step 1905 fuel and air are separately heated. At step 1910 the heated fuel and air are mixed in fuel-air mixing chamber 110. The heating in step 1905 may be such as to produce flash vaporization of the fuel at step 1910. At step 1915, an energetic material is injected into detonation tube 101 at igniters 162. Step 1915 may be omitted. At step 1920, corona discharge electrodes are energized so as to ionize air near igniters 162. Step 1920 may be omitted. At step 1925, the fuel-air mixture is injected into detonation tube 101 via injectors. Step 1925 may be performed in various ways including: a) the fuel-air mixture is injected into detonation tube 101 both from upstream end 102 thereof and along axially extended portion 104 thereof; b) the fuel-air mixture is injected into detonation tube 101 at least partly in a downstream direction of detonation tube 101; c) the fuel-air mixture is injected into detonation tube 101 from different angular positions on the perimeter of detonation tube 101, or more specifically, from both sides of the vertical axis of detonation tube 101; and d) the fuel-air mixture is injected into detonation tube 101 first from an upstream injector and, after commencement of the injecting from the upstream injector, from a downstream injector. These different ways of performing step 1925 are not necessarily mutually exclusive. At step 1930, the fuel-air mixture is ignited so as to initiate detonation of the fuel-air mixture. Step 1930 may be performed by simultaneously igniting a plurality of igniters 162. After the detonation has been initiated, step 1935 is performed. At step 1935, purge air is injected into detonation tube 101. As has been described above, the time of performing step 1935 may be varied, for example, after the detonation wave has exited detonation tube 101 or prior thereto. Step 1935 may be performed in various ways including: a) the purge air is injected into detonation tube 101 at least along axially extended portion 104 thereof; b) the fuel-air mixture is injected into detonation tube 101 both from upstream end 102 thereof and along axially extended portion 104 thereof; c) the fuel-air mixture is injected into detonation tube 101 at least partly in a downstream direction of detonation tube 101; and d) the purge air is injected into detonation tube 101 from different angular positions on the perimeter of detonation tube 101, or more specifically, from both sides of the horizontal axis of detonation tube 101. These different ways of performing step 1935 are not necessarily mutually exclusive. Following step 1935, the process (cycle) returns to step 1905. In a subsequent iteration of the cycle, in the event that sufficient excess heated fuel and air remains from step 1905 in a previous iteration, step 1905 may not need to be performed in the subsequent iteration. In addition, step 1935 may be omitted, or may be skipped in alternate iterations of the cycle, or in selected iterations of the cycle. To be sure, additional steps may be performed, and modifications may be made to the cycle described here, as will be understood by one of ordinary skill in the art in view of the totality of the description provided in the instant application, which includes additional description of the operation of the PDE.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged (including, e.g., steps re-ordered), or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method of operating a pulsed detonation engine comprising:
   providing a pulsed detonation engine comprising:
      a detonation tube configured to receive gaseous fuel and an oxidizer to be detonated therein, wherein the detonation tube comprises a perimeter wall, an upstream end, a downstream end, a longitudinal axis extending from the upstream end to the downstream end, and an axially extended portion extending along the longitudinal axis from the upstream end to the downstream end;
      one or more fuel-oxidizer injectors configured to inject the gaseous fuel and the oxidizer into the detonation tube, wherein the one or more fuel-oxidizer injectors are disposed at the upstream end and the perimeter wall along the axially extended portion of the detonation tube, wherein the one or more fuel-oxidizer injectors defines an array of orifices having a central orifice and a plurality of elongate orifices substantially surrounding the central orifice, wherein the central orifice is defined at the geometric center of the one or more fuel-oxidizer injectors, wherein the central orifice has a central orifice axis perpendicular to the longitudinal axis of the detonation tube, wherein each of the plurality of elongate orifices defines an elliptical shape or an elongated circle shape and has an orifice axis at an acute angle relative to the central orifice axis, wherein the central orifice is configured to inject the gaseous fuel and oxidizer in a radial direction and wherein the elongate orifices are configured to inject the gaseous fuel and oxidizer in a direction having an axial and radial component into the detonation tube; and an ignition configured to ignite the gaseous fuel and the oxidizer in the detonation tube so as to initiate detonation of the gaseous fuel and the oxidizer;

injecting the gaseous fuel and the oxidizer into the detonation tube via the one or more injectors; and igniting the gaseous fuel and the oxidizer in the detonation tube so as to initiate detonation of the gaseous fuel and the oxidizer, wherein the gaseous fuel and the oxidizer are injected into the detonation tube both from the upstream end and along the axially extended portion of the detonation tube.

2. The method according to claim 1, wherein at least one of the one or more fuel-oxidizer injectors is disposed along the axially extended portion and is inclined toward the downstream end of the detonation tube, and wherein the gaseous fuel and the oxidizer are injected into the detonation tube at least partly in a downstream direction of the detonation tube.

3. The method according to claim 1,
wherein the axially extended portion extends also from the longitudinal axis, at any point thereon, in a direction perpendicular to the longitudinal axis, to the perimeter wall,
wherein at least two of the one or more fuel-oxidizer injectors are disposed along the axially extended portion of the detonation tube at different angular positions on the perimeter wall, and
wherein the gaseous fuel and the oxidizer are injected into the detonation tube from different angular positions on the perimeter wall of the detonation tube.

4. The method according to claim 1,
wherein one of the one or more fuel-oxidizer injectors is an upstream fuel-oxidizer injector and another one of the one or more fuel-oxidizer injectors is a downstream fuel-oxidizer injector, wherein a first longitudinal distance between the upstream fuel-oxidizer injector and the upstream end is smaller than a second longitudinal distance between the downstream fuel-oxidizer injector and the upstream end,
wherein the pulse detonation engine further comprises, for each of the fuel-oxidizer injectors, a valve corresponding thereto configured to control the injection of the gaseous fuel and the oxidizer from the respective fuel-oxidizer injector into the detonation tube, and, for each of the valves, a controller corresponding thereto configured to control the respective valve so as to adjust the timing of the injection from the fuel-oxidizer injector corresponding to the respective valve, whereby phased injection may be performed, the phased injection comprising injecting of the gaseous fuel and the oxidizer into the detonation tube from the upstream fuel-oxidizer injector and, after commencement of the injecting from the upstream fuel-oxidizer injector, injecting of the gaseous fuel and the oxidizer into the detonation tube from the downstream fuel-oxidizer injector, and wherein the gaseous fuel and the oxidizer are injected into the detonation tube first from an upstream fuel-oxidizer injector and, after commencement of the injecting from the upstream fuel-oxidizer injector, from a downstream fuel-oxidizer injector.

5. A pulsed detonation engine, comprising:
a detonation tube configured to receive gaseous fuel and an oxidizer to be detonated therein, wherein the detonation tube comprises a perimeter wall, an upstream end, a downstream end, a longitudinal axis extending from the upstream end to the downstream end, and an axially extended portion extending along the longitudinal axis from the upstream end to the downstream end;

a fuel-oxidizer premix chamber configured to premix the gaseous fuel and oxidizer prior to entry of the gaseous fuel and oxidizer into the detonation tube;

one or more fuel-oxidizer injectors configured to uniformly inject the pre-mixed gaseous fuel and the oxidizer from the pre-mix chamber into the detonation tube, wherein the one or more fuel-oxidizer injectors are disposed at the upstream end and along the axially extended portion of the detonation tube, wherein the one or more fuel-oxidizer injectors defines an array of orifices having a central orifice and a plurality of elongate orifices substantially surrounding the central orifice, wherein the central orifice has a central orifice axis perpendicular to the longitudinal axis of the detonation tube, wherein each of the plurality of elongate orifices defines an elliptical shape or an elongated circle shape and has an orifice axis at an acute angle relative to the central orifice axis, wherein the central orifice is configured to inject the pre-mixed gaseous fuel and oxidizer in a radial direction and wherein the elongate orifices are configured to inject the pre-mixed gaseous fuel and oxidizer in a direction having an axial and radial component into the detonation tube; and an ignition configured to ignite the pre-mixed gaseous fuel and the oxidizer in the detonation tube so as to initiate detonation of the pre-mixed gaseous fuel and the oxidizer.

6. The pulsed detonation engine according to claim 5,
wherein the detonation tube comprises (a) a height extending in a vertical direction perpendicular to the longitudinal axis, and (b) a width extending in a horizontal direction perpendicular to the longitudinal axis, and
wherein at least one of the one or more fuel-oxidizer injectors is disposed along the axially extended portion and is inclined relative to the vertical direction and/or the horizontal direction.

7. The pulsed detonation engine according to claim 5, wherein at least one of the one or more fuel-oxidizer injectors is disposed along the axially extended portion and is inclined toward the downstream end of the detonation tube.

8. The pulsed detonation engine according to claim 5, wherein the axially extended portion extends also from the longitudinal axis, at any point thereon, in a direction perpendicular to the longitudinal axis, to the perimeter wall, and wherein at least two of the one or more fuel-oxidizer injectors are disposed along the axially extended portion of the detonation tube at different angular positions on the perimeter wall.

9. The pulsed detonation engine according to claim 5, wherein the axially extended portion extends also from the longitudinal axis, at any point thereon, in a direction perpendicular to the longitudinal axis, to the perimeter wall, and wherein at least two of the one or more fuel-oxidizer injectors are disposed along the axially extended portion of the detonation tube in a staggered arrangement, whereby the at least two or more injectors are located at different positions in the direction of the longitudinal axis and at different angular positions on the perimeter wall.

10. The pulsed detonation engine according to claim 5, wherein the plurality of elongate orifices are arranged around the central orifice in a shape that is at least partly curved.

11. The pulsed detonation engine according to claim 5, wherein one of the one or more fuel-oxidizer injectors is an upstream fuel-oxidizer injector and another one of the one or more fuel-oxidizer injectors is a downstream fuel-oxidizer injector, wherein a first longitudinal distance between the upstream fuel-oxidizer injector and the upstream end is smaller than a second longitudinal distance between the downstream fuel-oxidizer injector and the upstream end, and wherein the pulse detonation engine further comprises, for each of the fuel-oxidizer injectors, a valve corresponding thereto configured to control the injection of the pre-mixed gaseous fuel and the oxidizer from the respective fuel-oxidizer injector into the detonation tube, and, for each of the valves, a controller corresponding thereto configured to control the respective valve so as to adjust the timing of the injection from the fuel-oxidizer injector corresponding to the respective valve, whereby phased injection may be performed, the phased injection comprising injecting of the pre-mixed gaseous fuel and the oxidizer into the detonation tube from the upstream fuel-oxidizer injector and, after commencement of the injecting from the upstream fuel-oxidizer injector, injecting of the pre-mixed gaseous fuel and the oxidizer into the detonation tube from the downstream fuel-oxidizer injector.

12. The pulsed detonation engine according to claim 5, wherein the axially extended portion extends also from the longitudinal axis, at any point thereon, in a direction perpendicular to the longitudinal axis, to the perimeter wall, and wherein the pulsed detonation engine further comprises a cooling jacket surrounding at least a portion of the detonation tube, the cooling jacket comprising one or more flow channels extending in a direction of the perimeter wall.

13. The pulsed detonation engine according to claim 5, further comprising:

a fuel heater configured to heat a liquid fuel to a temperature below its boiling point; and a second heater configured to heat the oxidizer.

14. The pulsed detonation engine according to claim 5, wherein a cross-section of the axially extending portion taken perpendicular to the longitudinal axis, at one or more points along the longitudinal axis, has a shape comprising, at least in part, one or more straight line sections.

15. The pulsed detonation engine according to claim 5, wherein a jet ejected from a first orifice of the plurality of orifices has an angular extent that is different than the angular extent of a second orifice of the plurality of orifices.

16. The pulsed detonation engine according to claim 5, wherein the pulse detonation engine further comprises:

for each of the fuel-oxidizer injectors, a rotary valve corresponding thereto configured to control the injection of the pre-mixed gaseous fuel and the oxidizer from the respective fuel-oxidizer injector into the detonation tube;

for each of the rotary valves, a controller corresponding thereto configured to control the respective rotary valve so as to adjust the timing of the injection from the fuel-oxidizer injector corresponding to the respective rotary valve; and for each of the rotary valves, a corresponding stepper motor configured to independently drive each of the rotary valves.

17. The pulsed detonation engine according to claim 5, wherein the upstream end of the detonation tube is closed by an endwall, wherein at least one of the one or more fuel-oxidizer injectors is disposed on the endwall, wherein at least one of the one or more fuel-oxidizer injectors is disposed at the upstream end, and wherein at least one of the one or more fuel-oxidizer injectors is disposed along the axially extended portion of the detonation tube.

18. The pulsed detonation engine according to claim 5, further comprising:

a Shchelkin spiral positioned in the axially extended portion of the detonation tube, wherein the Shchelkin spiral is configured to promote detonation in the detonation tube; and a means for cooling the Shchelkin spiral.

19. The pulsed detonation engine of claim 5, wherein each of the plurality of elongate orifices has a cross-sectional shape that is a completely convex, closed curve when viewed parallel to the longitudinal axis of the detonation tube.

20. The pulsed detonation engine of claim 19, wherein each of the plurality of elongate orifices is elliptical in shape when viewed parallel to the longitudinal axis of the detonation tube.

* * * * *